United States Patent [19]

Papa

[11] 4,033,909

[45] July 5, 1977

[54] STABLE PHENOLIC RESOLES

[75] Inventor: Anthony Joseph Papa, Saint Albans, W. Va.

[73] Assignee: Union Carbide Corporation, New York, N.Y.

[22] Filed: July 14, 1975

[21] Appl. No.: 595,744

Related U.S. Application Data

[63] Continuation-in-part of Ser. No. 497,072, Aug. 13, 1974, abandoned.

[52] U.S. Cl. .......................... 260/2.5 F; 260/59 R; 260/60
[51] Int. Cl.² ..................... C08G 8/08; C08G 8/10; C08J 9/00
[58] Field of Search ............... 260/2.5 F, 59 R, 60, 260/2.1 C, 2.2 C

[56] References Cited

UNITED STATES PATENTS

| | | | |
|---|---|---|---|
| 2,865,875 | 12/1958 | Hyman et al. | 260/59 R |
| 3,432,453 | 3/1969 | Gladney et al. | 260/60 |
| 3,657,188 | 4/1972 | Perkins | 260/60 |

OTHER PUBLICATIONS

Encyclopedia of Pol. Sci. & Techn. (vol. 7) (Interscience) (N.Y.) (1967), pp. 724, 725, & 729.
Whitehouse et al.–Phenolic Resins (Iliffe Books Ltd.) (London) (2nd ed.) (1967), pp. 123–124.

*Primary Examiner*—Donald E. Czaja
*Assistant Examiner*—H. H. Fletcher
*Attorney, Agent, or Firm*—Marylin Klosty

[57] ABSTRACT

Phenolic resoles are provided which are free of ionic species capable of being removed by the free acid form of a cation exchange resin and the free base form of an anion exchange resin. The deionized resoles of the invention have extended shelf-life due to their enhanced inherent stability towards self-condensation under otherwise adverse aging conditions. Notwithstanding their extended shelf-life, the resoles of the invention have excellent reactivity as foamable compositions, and are used with particular advantage for the formation of cellular phenolic resins. Also provided is a method for producing phenolic resoles having the aforementioned characteristics which comprises treatment of alkaline metal catalyzed condensates of a phenol and an aldehyde with cation and anion exchange resins in their respective free acid and free base forms.

34 Claims, 3 Drawing Figures

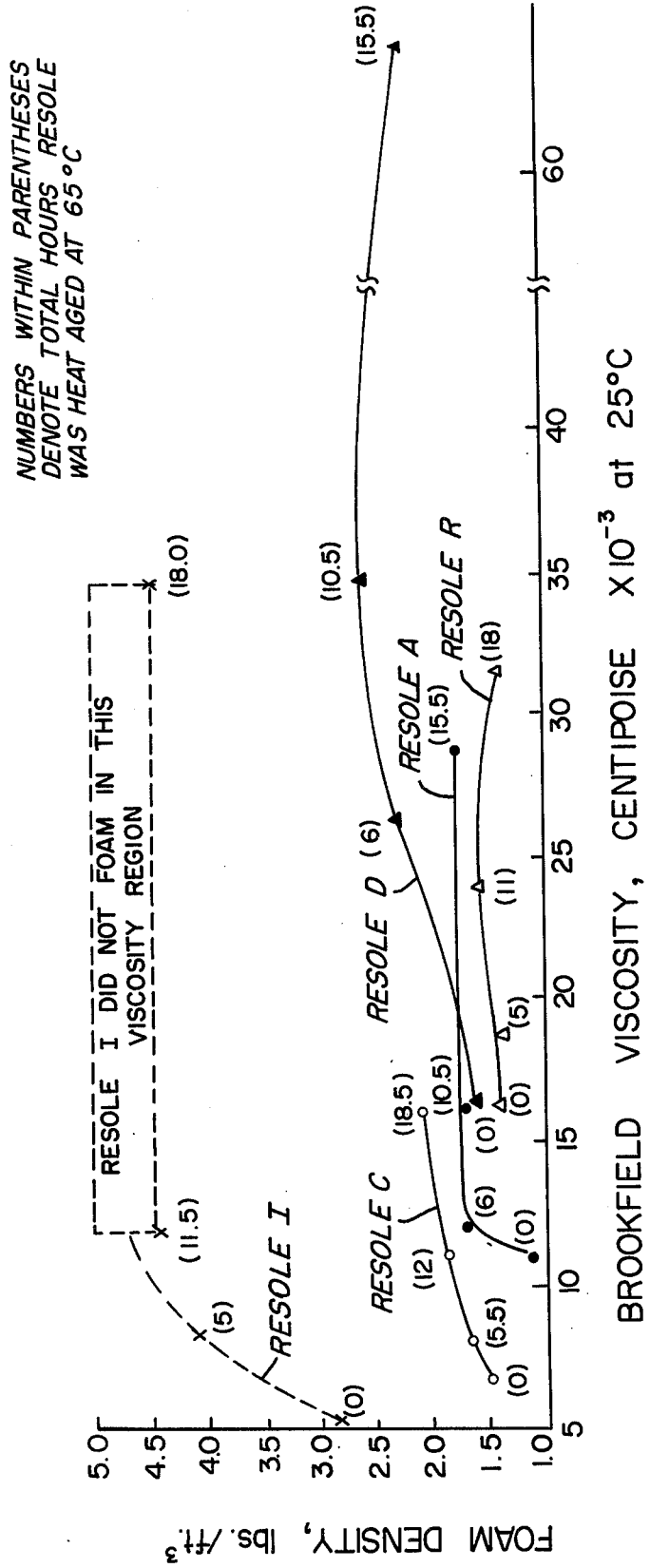

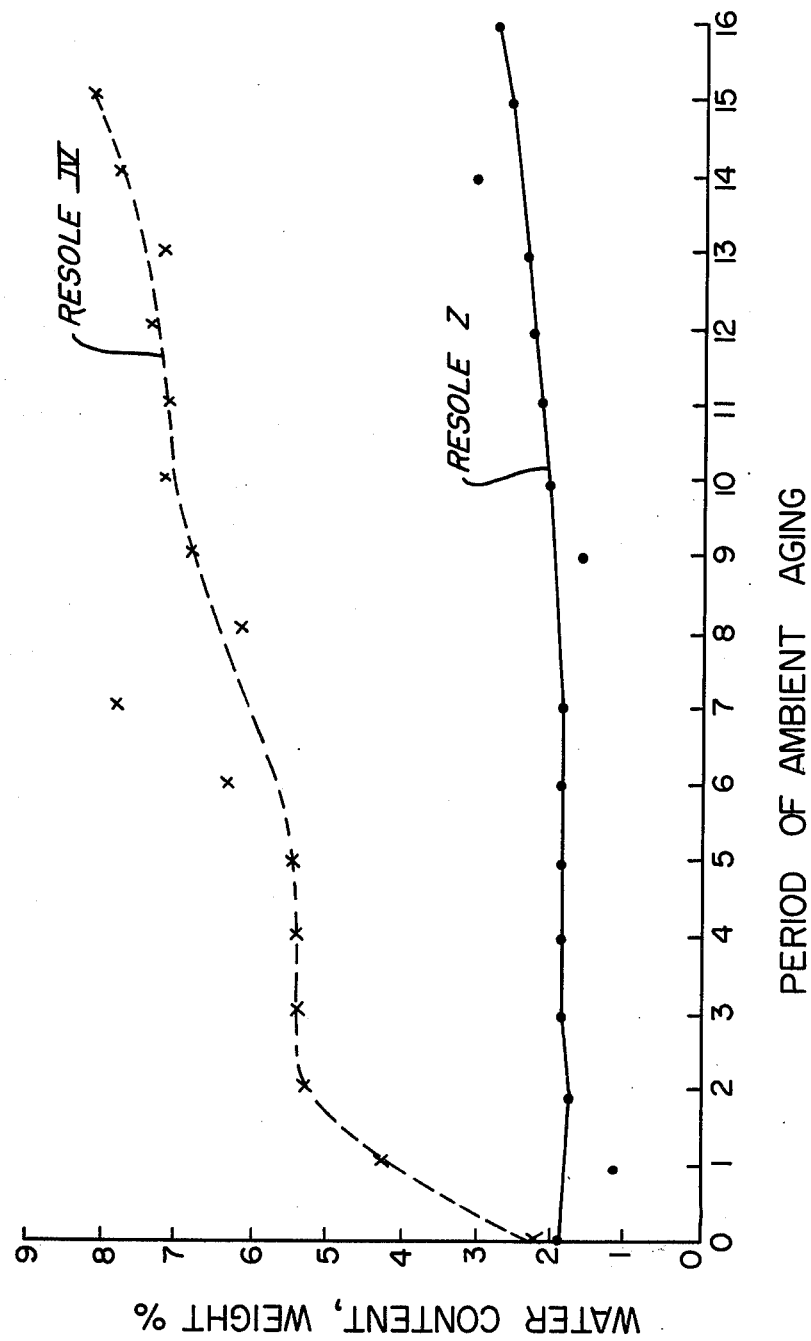

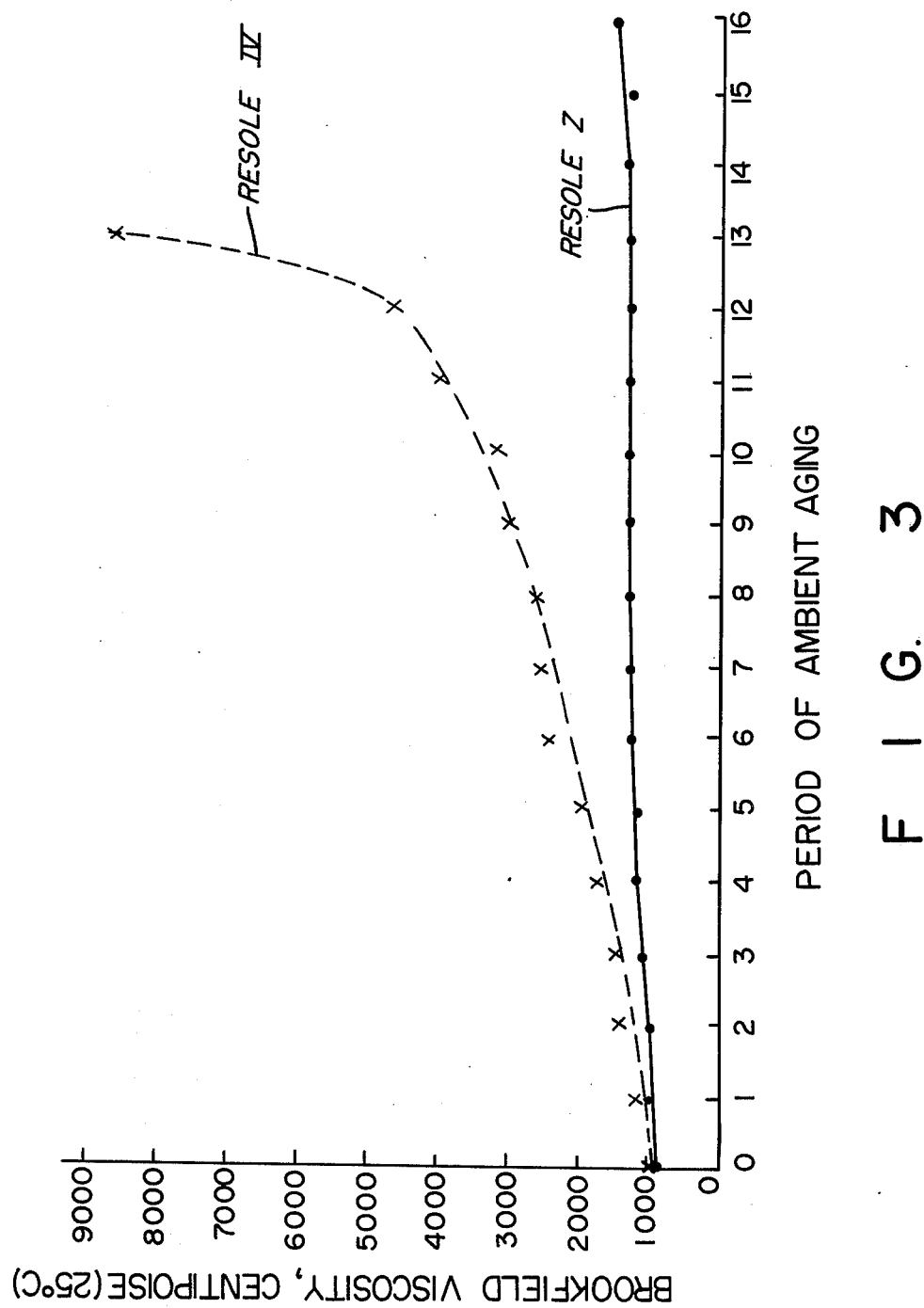

STABLE PHENOLIC RESOLES

This application is a continuation-in-part of my prior and copending application Ser. No. 497,072, filed Aug. 13, 1974, now abandoned.

FIELD OF THE INVENTION

The present invention relates to the field of base-catalyzed condensation products derived from a phenol and an aldehyde such as, in particular, phenol-formaldehyde resoles. In one aspect, the invention pertains to condensates having improved stability towards loss in reactivity when maintained under otherwise adverse aging conditions. In another specific aspect, the invention relates to liquid condensates which, in addition to extended shelf life, are especially suitable for the formation of cellular phenolic resins.

BACKGROUND OF THE INVENTION

It is well known to the art that condensation of a phenol and an aldehyde provides materials curable to thermoset phenolic resins. Base-catalyzed condensation employing at least about a stoichiometric amount of aldehyde provides condensates known as resoles whereas acid catalysts and a deficiency of aldehyde provides novolacs. Characteristic of both liquid and solid resoles is their heat-curability to fully cross-linked, infusible products without the need for an added cross-linking agent. From this standpoint, resoles are more descriptively referred to as One-Step phenolic resins in contrast to novolacs or Two-Step resins which do require the addition of a cross-linking agent for the curing process. The reactivity of resoles and ability to self-condense to higher molecular weight resins is attributable to the presence of hydroxymethyl groups which become bonded to the aromatic phenolic nucleus during the base-catalyzed condensation.

Curing of resoles to higher molecular weight, cross-linked thermoset resins proceeds with generation of heat and is accelerated by acid materials. In the presence of strongly acidic accelerators of the exothermic reaction and a source of blowing action, liquid resoles cure rapidly to cellular phenolic resins. Although phenolic foams are used to embed floral arrangements and for general packaging purposes, they have not found the widespread industrial application enjoyed by cellular polyurethanes. As compared with cellular polyurethanes, phenolic foams possess an outstanding inherent resistance to burn with an open flame, and emit very low levels of smoke on heating. Consequently, greater attention is being focused on phenolic foams for a variety of end-use applications where fire is especially hazardous. In addition to improving certain properties of phenolic foams such as their friability and punking behavior (that is, glowing combustion without a visible flame), there is also a need to overcome certain drawbacks associated with the resole raw materials such as, in particular, their poor shelf-life. From the standpoint of commercial application, the most significant resoles are those derived from phenol itself and formaldehyde.

As generally described in the literature, formation of phenol-formaldehyde resoles comprises condensation of phenol with at least about an equimolar amount of formaldehyde in the presence of an alkaline metal catalyst and treatment of the condensate with an acid such as sulfuric acid to neutralize the alkaline catalyst. Depending upon the end-use application of the resole product, the water content of the neutralized condensate may be adjusted to a predetermined level either by dilution or dehydration. If an alkali metal hydroxide is employed as the catalyst, the condensate may require filtration to remove precipitated salts formed during neutralization depending upon the water content and end-use application of the resole product. Irrespective of whether the neutralized condensate is filtered, alkali metal salts are present in the product. In any event, in the commercial manufacture of phenol-formaldehyde resoles supplied as foamable resins, filtration is avoided by the employment of barium hydroxide catalyst which, when neutralized with sulfuric acid, forms a salt which does not precipitate and is left in the product.

The exact composition of phenol-formaldehyde resoles has not been elucidated. However, it is generally recognized that they contain varying amounts of mono-, di- and tri- methylolated mononuclear phenols (phenol alcohols) as well as polymethylolated polynuclear phenols. The methylol groups are activated by the presence of phenolic hydroxyl groups and consequently conventional resoles undergo facile self-condensation, even at room temperature, which contributes to their poor shelf-life.

The problem of resole instability is a longstanding one and is associated with commercially available phenol-formaldehyde resoles. It is of particular concern with respect to liquid resoles of low water content supplied as foamable resins. Thus, unless many grades of liquid resoles are employed by the foam manufacturer within a relatively short period of time after their preparation, they gradually lose their initial reactive thermosetting character. For example, resoles designed for manufacture of rigid foam of medium to high density grade (about 1.5 to about 30 pounds per cubic foot) by controllable pour-in-place reactions (free-rise or molded), "deaden" as foamable compositions after about four or less weeks storage at ordinary ambient temperatures (e.g., about 20°–25° C). It is evident that gradual loss in reactivity during storage hampers standardization of foam formulations to achieve foamed products of predetermined specifications such as foam density. In order to slow their tendency to advance to a higher molecular weight and less reactive form, such resoles specified for manufacture of rigid phenolic foam of medium to high density grade, are maintained at below ordinary ambient temperatures such as 5° C. and are often refrigerated during storage and shipment. Installation and maintenance of refrigeration or cooling equipment at the foam manufacturing plant site for storage purposes is, of course, costly and troublesome.

Other commercially available resoles are designed for manufacture of very low density foam (0.2 to about 0.4 pound per cubic foot) and have a substantially higher content of free phenol which, generally, is from about 20 to about 40 weight percent. Such specialty resoles are reported as storable for reasonable lengths of time (maximum of three months at 24° C.), although for maintenance of foam performance, the resole manufacturer recommends that they be kept at temperatures below 21° C. and that extended storage be avoided. In view of their highly reactive nature in the presence of acidic catalysts of conventional foam formulations, foaming at less than ambient temperature is required in order to control the curing process and obtain a product of satisfactory quality. Ordinarily, therefore, such resoles are blended with other less reactive materials or as such are suitable for spray application of phenolic foam.

It is desirable and is a primary object of this invention to provide base-catalyzed condensates of a phenolic compound and an aldehyde, particularly phenol-formaldehyde resoles, having improved aging characteristics.

Another object is to provide resoles which, in addition to extended shelf-life, are especially useful in providing cellular phenolic products.

Another object is to provide phenol-formaldehyde resoles which substantially retain their reactivity as foamable compositions during prolonged storage at ambient conditions and which are capable of being foamed to cellular phenolic products of a wide density range including densities as low as about 0.5 pounds per cubic foot, by controllable pour-in-place foaming reactions.

A further object is to provide a method for producing resoles having the aforesaid characteristics.

Various other objects and advantages of this invention will become apparent to those of ordinary skill in the art from the accompanying description and disclosure.

SUMMARY OF THE INVENTION

In accordance with one aspect of the present invention, phenolic resoles are provided which are free of ionic species capable of being removed by the free acid form of a cation exchange resin and by the free base form of an anion exchange resin. The compositions of the invention, and especially the deionized phenol-formaldehyde resoles, are used with particular advantage in forming cellular phenolic products including medium to high density phenolic foam as well as foam of low density (between about 0.5 and about 1.5 pounds per cubic foot) by controllable pour-in-place foaming reactions. Resoles of the invention also possess reactivity sufficiently high to allow for their use in forming very low density foam (0.2 to about 0.5 pounds per cubic foot) by spray application.

It has been discovered that the deionized resoles of the invention possess a highly desirable and unexpected combination of properties. One such property is their inherently greater stability towards self-condensation than the above-described resoles employed in commercial practice. One manifestation of the inherently greater stability of the resoles of the invention is their extended shelf-life. As used in the context of the present invention, "shelf-life" denotes the period of aging (accelerated heat aging or ambient aging) during which a given resole substantially retains its initial reactivity as a foamable composition. Reactivity in turn is the rate at which the foam polymer forms when the resole is subjected to acid catalysts and is reflected by polymerization reaction time (e.g., cream and rise times) and, in particular, by the density of the foam product. In marked contrast to the poor shelf-life of the above-described commercial resoles having medium to high density foam specifications, resoles of the invention suitable for formation of foam of corresponding density, retain their reactivity as foamable compositions for far greater periods of time at ordinary ambient temperatures (about 20° C.–26° C.) such as at least three to six months and longer, thereby obviating the need for cooling or refrigeration prior to use. The enhanced inherent stability of the deionized resoles of the invention is also reflected by the observation that the time within which they polymerize to a state of gelation as opposed to the fully cured thermoset state, is also longer relative to the gel point of conventional resoles.

A further indicia of the greater inherent stability of the resoles of the invention towards selfcondensation to less reactive forms is the slower rate at which water builds up during prolonged standing. Thus, although the aforementioned commercially available highly reactive resoles specified for very low density foam have reasonably good shelf-life, the water content thereof increases at a substantially greater rate than that observed for resoles of the invention.

Another characteristic of the resoles of the invention is that, notwithstanding their inherently greater stability and thus their extended shelf-life, they have enhanced reactivity as foamable compositions when subjected to acidic catalysts. One manifestation of their enhanced reactivity is that they require less catalyst to provide foam of a given density than is otherwise required with conventional foaming phenolic resins. A further property of the deionized resoles provided by the invention is that the substantial increase in viscosity which is observed during aging is not accompanied by a corresponding loss in their reactivity as foamable compositions.

The accompanying FIGS. 1, 2 and 3 show the affect of heat aging on resole viscosity and foam density (FIG. 1) and of ambient aging on water content (FIG. 2) and viscosity (FIG. 3) of resoles of the invention and conventional foaming resoles employed in commercial practice. These figures and the data on which they are based are discussed in the context of Examples 34-35 (FIG. 1) and Example 45 (FIGS. 2 and 3) hereinbelow.

In accordance with a second aspect of the teachings of this invention, liquid phenolic resoles having improved shelf-life are provided by the method which comprises deionization of liquid condensate formed by the alkaline metal catalyzed reaction of a phenolic compound and an aldehyde by the treatment thereof with the free acid form of a cation exchange resin and the free base form of an anion exchange resin. The present process is applied with particular advantage to liquid phenol-formaldehyde condensates which have been formed in the presence of an alkaline metal catalyst such as hydroxides, oxides, carbonates and bicarbonates of any of the alkali metal and alkaline earth metals. Illustrative of suitable catalysts are the respective hydroxides of lithium, sodium, potassium, rubidium, cesium, francium, barium, calcium and magnesium, as well as potassium and sodium carbonates, bicarbonates, calcium oxide, and the like. Although the process is described with particular reference to condensates of phenol and formaldehyde, it is also applicable to condensates of other phenolic compounds and aldehydes.

DETAILED DESCRIPTION OF THE INVENTION AND PREFERRED EMBODIMENTS

The excellent shelf-life and aging characteristics of the novel alkaline metal catalyzed resole compositions of the present invention is attributable to their freedom from ionic species that respond to removal by the aforementioned ion exchange resins which are of two types. The first type is a cation exchange resin in its free acid form, that is, having exchangeable hydrogen cations ($H^+$) attached thereto. Such resins exhibit exchange potential with alkaline metal cations introduced to the phenol-formaldehyde condensate as catalyst such as $Na^+$, $K^+$ and $Ba^{++}$. The hydrogen cations of the exchange resin are present as strongly acidic groups such as sulfonic acid groups ($-SO_3H$) or as weakly acidic groups ($-COOH$). Preferably, the cation exchange resin is of the strongly acidic variety. The particular polymeric structure to which the cation exchanging groups are attached is not critical to the obtainment of the novel compositions of the present invention. Examples of suitable strong cation exchange resins are: styrenedivinylbenzene sulfonated resins, phenol-formaldehyde sulfonic acid resins, benzene-formaldehyde sulfonic acid resins, and the like. Such resins have been sold and marketed by several companies under various trade names. For instance, Rohm and Haas Company's series of sulfonated copolymers of styrene and divinylbenzene, available as Amberlite 200, 200C, IR-120, IR-122, IR-124 and XE-100, respectively, are suitable. Other suitable strong acid cation exchange resins are marketed by Dow Chemical Company as Dowex 50-W, and by Diamond Shamrock Company as Duolite C-3 and C-25. Illustrative of the weakly acidic cation exchange resins are crosslinked-acrylic polymers and copolymers of methacrylic acid and divinylbenzene available as Amberlite IRC-84 and IRC-50, respectively of Rohm and Haas Company.

Some of the above-described cation exchange resins are marketed in the salt form. Therefore, prior to use in accordance with the teachings of the present invention, such resins are treated to convert the ion exchange groups into the free acid form. This is readily effected with a mineral acid such as sulfuric acid or hydrochloric acid and the like. An excess of acid is generally used. Afterward, the excess acid is washed out with water or suitable solvent to remove the released salts. Spent resin is regenerated similarly.

The novel resoles of the invention are also free of anions capable of being removed by an anion exchange resin in its free base form, that is, in a form having hydroxyl or free amino groups thereon. The anion exchange resin may be in either a strongly basic or weakly basic form. Those of the strongly basic variety are usually copolymers of styrene and divinylbenzene having quaternary ammonium substituents such as $[-N(CH_3)_3]^+Cl^-$ and $-[N(CH_3)_2(CH_2OH)]^+Cl^-$. Illustrative of suitable resins of this type are marketed by Rohm and Haas Company as Amberlite IRA-900, IRA-904, IRA-910, IRA-911 and IRA-400, respectively. Prior to use in accordance with the teachings of the present invention, such strongly basic anionic resins are treated with alkali such as aqueous alkali metal hydroxide solutions to replace the chloride anions with free hydroxyl and, thereby form the trimethyl-ammonium hydroxide radical, $-N(CH_3)_3^+OH^-$. The resin is then washed thoroughly with water to remove the chloride salts. Also suitable are the weakly basic anion exchangers having polyamine functionality bonded to a matrix of styrene-divinylbenzene copolymer or cross-linked acrylic polymer. Such resins are available in their free base form from Rohm and Haas Company as Amberlite IRA-45, IRA-93 and IRA-68, respectively. When these various anion exchangers become spent they are readily regenerated by treatment with strong alkali (e.g., 2-5 weight percent aqueous potassium hydroxide) to replenish the hydroxyl groups or, in the case of the weakly basic variety, to free the amine functionality of salts.

In the use of the above-described ion exchangers in the process of the present invention, the ion exchange operation may be carried out batchwise or continuously. In either mode of operation, the alkaline phenol-formaldehyde condensate may be deionized by treatment thereof with the two different types of ion exchange resins arranged as a mixed bed or as individual beds. In mixed bed operation, the alkaline condensate is intimately contacted with the exchange resin until the pH of the treated liquid substantially stabilizes at a value within the range of between about 4 and 7, thereby indicating essentially complete deionization.

In carrying out the ion exchange reactions employing individual beds of resin, the alkaline condensate is intimately contacted with the cation exchange resin in its free acid form for a residence time sufficient to lower the pH of the condensate undergoing treatment to a value within the range from about 1.5 to about 4. Preferably the treatment is effected until the pH substantially stabilizes at a particular value within this range. Usually the pH stabilizes at a value between about 2 and about 3.5. Stabilization of the pH indicates essentially complete removal of cations. The cation exchanged liquid is then intimately contacted with the free base form of the anion exchange resin for a residence time sufficient to raise the pH to a value within the range from about 4 to about 7. Preferably the anion exchange treatment is effected until the pH remains substantially stable at a particular value within this range. Usually the pH stabilizes at a value between about 4.5 and about 6.5. Stabilization of pH indicates essentially complete removal of anions.

By "substantial stabilization" of pH at a particular value within the aforesaid respective ranges is meant a condition at which fluctuation in pH is no greater than about ± 0.3.

In batch operation employing a mixture of the cation and exchange resins or sequential treatment of the alkaline condensate with these resepective ion exchangers, intimate contact is readily effected by agitation of a slurry of the resins in the liquid condensate by any suitable means. When the pH is brought to within the aforesaid ranges, the liquid condensate and exchange resins are separated by conventional liquid-solids techniques such as decantation or filtration. In carrying out deionization sequentially, the liquid condensate is treated intially with the cation exchange resin and, inasmuch as the cation-exchanged material is acidic and has not yet been de-anionized, such separation and passage of liquid to the anion exchange treatment step should be effected as quickly as possible to minimize residence time in the acid solution and thereby avoid polymerization.

In continuous operation, the ion exchange resins are conveniently contained in the same or different columns. The flow of condensate through the column or columns is operable in any direction, although usually the liquid condensate is passed downwardly through the exchange resins. The rate of flow through the resins is adjusted to obtain effluent from the respective cation and anion exchange resin beds, or mixed bed thereof, having a pH within the aforesaid respective ranges. Generally, the flow rate is between about 20 and about 50 pounds of condensate per minute per cubic foot of exchange resin. It is to be understood, however, that the flow rate required for any given deionization to obtain the aforesaid pH values may be lower or higher and is governed by a variety of factors such as the particle size of the ion exchange resin, the dimensions of the ion exchange bed, the viscosity of the liquid condensate to be treated, the concentration of alkaline metal catalyst employed in the condensation reaction and the capacity of the ion exchange resins. Flow rate or recycling requirements are readily determined by sampling effluent from the respective columns to measure the pH thereof. In the event the pH responds to addition of ion exchange resin (that is, the pH is not substantially stable), the effluent may be recycled through the resin bed or the flow rate adjusted accordingly to achieve essentially complete deionization.

The ion exchange reactions are effected at temperatures between about 20° C. and about 75° C. and usually at a temperature no higher than about 60° C. Maximum temperatures of between about 30° C. and about 50° C. are quite suitable. Application of heat from an external source is usually avoided, the temperatures above ambient being brought about simply by feeding warm condensate to the ion exchange system. Pressures do not appear to have a critical effect on the ion exchange reactions. While atmospheric pressure appears to be most convenient, increased or reduced pressures can also be used, as desired. In column operation, somewhat greater pressure at the inlet may be necessary to overcome the pressure drop within any given column, depending upon the flow resistance and tightness of the resin bed.

The excellent shelf life and aging characteristics of the resoles of the invention is due to their deionized state, that is, their freedom from ionic species that respond to removal by the above-described ion exchange resins. The state of deionization and freedom from such ionic species exists when the concentration of cations and anions has been reduced to a level sufficiently low that the pH of the ionexchanged resole remains substantially constant in the presence of the respective cation and anion exchange resins described herein.

The cations which are removed from the resole during the cation exchange reaction include metal cations corresponding to those of the alkaline metal catalyst employed in the condensation reaction. By treatment of the condensate until the pH substantially stabilizes within the aforementioned range from 1.5 to about 4, and preferably from about 2 to about 3.5, the content of alkaline metal cations derived from the catalyst (e.g., Na$^+$, K$^+$ or Ba$^{++}$) is reduced to essentially zero, that is, to less than about 100 parts per million, based on the weight of condensate and as determined by emission spectroscopy. It is to be understood, however, that other metal cations the nature of which is unknown, may also be exchanged with H$^+$ of the cation exchanger (such as, for example, cationic impurities present in the phenol, formaldehyde or catalyst or derived from the reactor) and may also have an adverse effect on resole shelf-life if not otherwise removed.

The nature of the anions which are removed during the anion exchange reaction has not been elucidated. It is postulated, that such anions may be derivatives of formic acid or benzoic acid. It is to be understood, however, that other theories may equally explain the reason for the discovery that, unless the cation exchanged resole is treated with anion exchange resin to a pH within the aforesaid range from about 4 to about 7, and preferably to a pH from about 4.5 to about 6.5, maximum resole stability towards irreversible self-condensation during aging is not achieved.

The deionized phenol-formaldehyde resoles of the invention are believed to comprise a complex assortment of species of the following types:

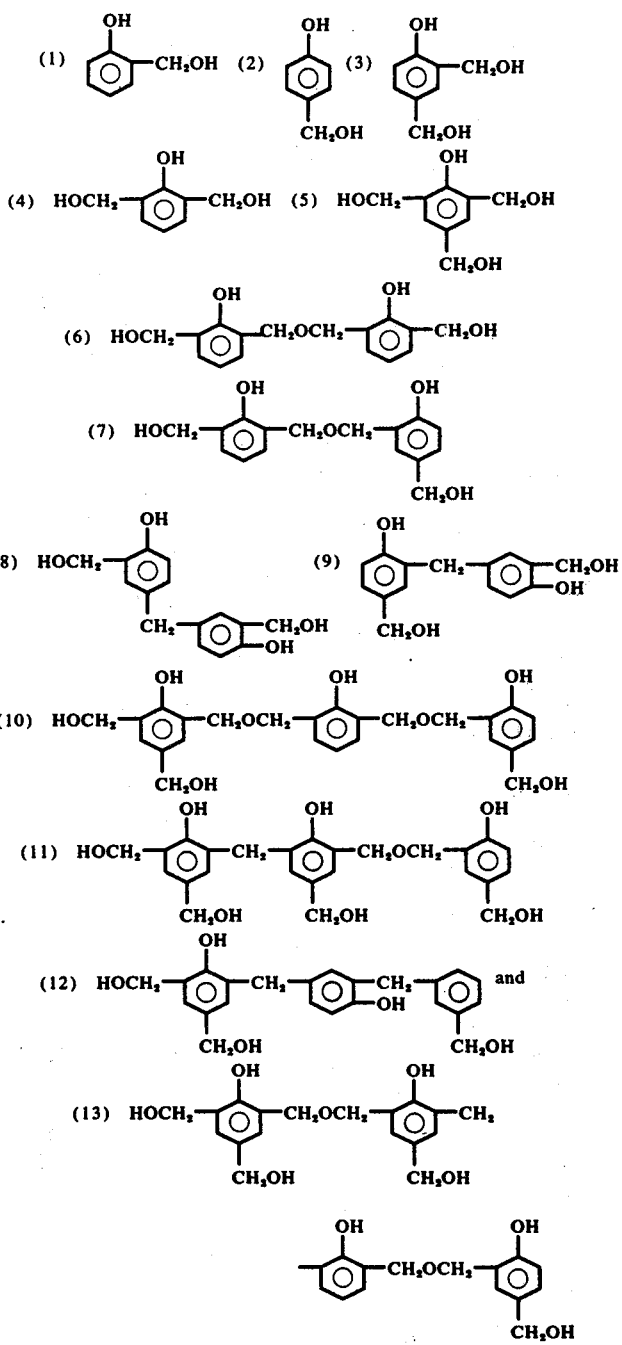

In regard to the above polynuclear structures, it is to be understood that corresponding species may be present wherein the bridging groups are all either methylene (—CH$_2$—) as illustrated by (12) or dimethylene ether (—CH$_2$OCH$_2$—) groups as illustrated by (10), or wherein any combination thereof are present as illustrated by (13).

The distribution and presence of the above species varies with the nature of the cation of the alkaline metal catalyst employed. In the presence of such alkaline metal cations, phenol provides phenate anions the resonance forms of which are in the ortho and para position, as shown below:

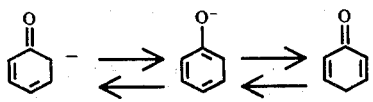

In the presence of alkaline metal catalysts comprising cations having essentially no tendency to complex in the ortho position to hydroxyl, that is $K^+$, $Cs^+$ and $Fr^+$, the thermodynamically more stable para-positioned anion is favored over the ortho form. Thus, when catalysts such as potassium hydroxide or cesium and francium compounds are used, formaldehyde will react more rapidly and to a greater extent with the more stable para-positioned anion. The resulting condensate, in turn, will have a greater distribution of para-methylol substituted species such as (7), (10), (11), (12) and (13) above as well as species derived by condensation of para-methylol groups such as (8) and (9), relative to the ortho-substituted species such as (4) and (6) above, although species of the latter type will usually be present. Consistent with this explanation, it is found that of the novel deionized resoles provided by the present invention, those compositions derived from condensates formed in the presence of potassium catalysts have a particularly outstanding and greater inherent reactivity as foamable compositions, relative to commercially produced foaming resoles. As previously described hereinabove, the latter resoles are formed in the presence of barium cations which have a strong tendency to complex in the ortho position thereby providing resoles having a greater distribution of orthomethylol substituted species. In the presence of salts and particularly anions which are in such commercial resoles, such ortho-positioned methylol groups readily selfcondense to higher molecular weight and less reactive oligomeric polymer species as reflected by their poor shelf-life and corresponding consequential loss in reactivity as foamable compositions, that is, when subsequently subjected to added relatively strong acidic catalysts for rapid foam polymer formation to the fully cured thermoset state. By the employment of catalysts such as potassium, cesium and francium hydroxides or salts thereof, the formation of the ortho-positioned methylol groups is lessened and thus retention of initial reactivity as foamable compositions is enhanced. It is to be understood, however, that whatever the relative tendencies of the initially produced alkaline metal catalyzed resoles to self-polymerize, the tendency of any given resole towards self-polymerization is suppressed by providing the resole in a deionized state as described herein.

It is to be understood therefore that, irrespective of the particular catalyst employed in forming the condensates which are deionized as described herein and irrespective of the relative inherent reactivities of the deionized products as foamable compositions, the novel resoles of the invention have the common characteristic of extended shelf-life due to their deionized state, and especially due to their freedom from anions that respond to removal by treatment with the above-described anion exchange resins.

In addition to their deionized state and extended shelf-life, the resoles of the invention have the further unusual characteristic of exhibiting a substantially rapid increase in their initial viscosity during heat aging without a corresponding loss in inherent reactivity as foamable compositions. On the other hand, the increase in viscosity exhibited by conventional resoles during heat aging is associated with a substantially faster rate of irreversible loss in reactivity as foamable compositions. The exact mechanism by which the stability of the resoles of the invention is achieved is not fully understood and various theories may be postulated. Without wishing to be bound thereby, one possible explanation is that the absence of ionic species allows for a transformation of orthomethylol groups to the thermodynamically more stable para-position where intermolecular hydrogen-bonding can predominate. Such equilibration may be expressed in simplified form as follows:

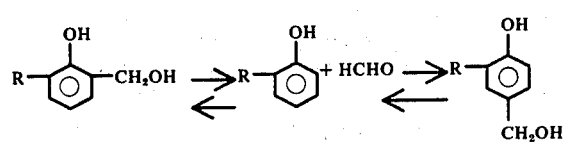

where R is hydrogen or methylol and, when alkyl-substituted phenols are used, R may also be alkyl. On the other hand, in conventional resoles containing ionic species, gelation reactions such as the dehydration of ortho-methylol groups to higher molecular weight polymers would be favored over the reverse reaction shown above and to be activated by the presence of salts. By providing deionized resoles, it is indicated that the dehydration or self-condensation reaction of orthomethylol groups is suppressed and intramolecular hydrogen bonding of such groups is favored. In this manner, therefore, freedom from ionic species allows for retention of ortho-methylol groups in a form susceptible to the above-described shift to the para-position where intermolecular hydrogen bonding is favored.

The phenol-formaldehyde condensates which are deionized in accordance with the teachings of this invention include those prepared at formaldehyde:-phenol molar ratios from about 1:1 to about 3:1. Usually, the formaldehyde is added to the reaction system as an aqueous solution containing from about 3.5 to about 45 weight percent HCHO. The relative proportions of phenol and formaldehyde are also often expressed in terms of formaldehyde factor which defines the parts by weight of aqueous formaldehyde solution charged to the reaction zone per 100 parts by weight of phenol. The value of the formaldehyde factor varies depending upon the content of formaldehyde in the particular aqeuous solution employed. As expressed on the basis of 37 weight percent aqueous formaldehyde, the factor is usually between about 100 and about 190, and is more usually between about 110 and about 180.

The concentration of alkaline metal catalyst employed to effect the condensation reaction may vary over a relatively wide range such as between about 0.1 and about 10, and is usually no more than about 5, parts by weight per 100 parts by weight of phenol fed to the reaction zone.

The condensation reaction is effected at temperatures between about 60° and about 110° C. and more usually between about 65° C. and about 100° C. The condensation may be effected at atmospheric pressure although usually reduced pressure such as between about 150 and about 650 mm. mercury is used. The pressure is adjusted consistent with the desired reaction temperature. Condensation time may vary between about 0.5 and about 15 hours.

A generally preferred overall combination of condensation conditions are temperatures between about 70° and about 90° C., reaction times from about one to about 4.5 hours, and catalyst concentrations from about 0.2 to about 4 weight percent (basis, phenol).

The particular combination of condensation reaction conditions employed depends to a large extent on the end use application of the deionized resole product such as the desired grade of density of the phenolic foam derived therefrom. As a general guideline, as the severity of the combination of reaction conditions is lessened, the more highly reactive is the subsequently deionized resole product and thus the lower the density of the phenolic foam produced therefrom. For example, effecting the condensation at a formaldehyde factor between about 160 and about 180 (basis, 37 weight percent HCHO solution), a temperature from about 75° C. to about 85° C. and a reaction time between about 3 and about 4.5 hours in the presence of between about one and about two weight percent of alkaline catalyst (basis, phenol), generally provides resoles which, when subsequently deionized, are foamable to higher density grade foam than resoles provided by effecting the condensation under these conditions but at a lower formaldehyde factor of about 110 to about 120. By way of further illustration, a similar result can be realized at a formaldehyde factor between about 160 and about 180, by lowering the severity of one or more of the other reaction conditions, that is, temperature, reaction time or catalyst concentration such as, in particular, by lowering the catalyst concentration to between about 0.5 and one weight percent. The condensation conditions also appear to influence the amount of free phenol contained in the resole product which, as in the case of conventional resoles supplied as foamable compositions, may vary over a relatively wide range such as from about 2 to about 40 weight percent. Generally, the less severe the combination of condensation conditions, the higher the content of free phenol within this range.

It is also to be understood that the above are general guidelines of the various reaction conditions which, for any given alkaline metal catalyst, favor the formation of condensates which when subsequently deionized as described herein, provide stable resoles of varying reactivity as foamable compositions. From the standpoint of providing resoles having a particularly unique and outstanding combination of improved inherent stability and enhanced inherent reactivity as foamable compositions, the preferred catalysts are compounds of potassium, cesium and francium. Of these, potassium compounds constitute the preferred class of catalysts, in view of their greater availability. Any of the various grades of potassium hydroxide available commercially are suitably employed as the condensation catalyst. These various grades include potassium hydroxide produced by electrolysis of potassium chloride in standard diaphragm electrolytic cells and in mercury cells. Generally in mercury cells, potassium chloride is electrolyzed in an electrolyzer provided with a mercury cathode forming chlorine at the anode and potassium metal at the mercury cathode. The potassium amalgamates with the mercury and the amalgam is then passed to a decomposer containing either graphite or iron in which it is treated with water or steam forming potassium hydroxide solution and hydrogen. The potassium hydroxide product of the mercury cell electrochemical process has a residual potassium chloride content which, in general, is less than that of potassium hydroxide recovered from standard electrolysis of potassium chloride in a chlorine cell wherein the anode and cathode compartments are simply separated by a diaphragm. Also suitable as the phenolformaldehyde condensation catalyst is potassium hydroxide, derived from either a diaphragm cell or a mercury cell, which has been subjected to further purification to reduce the content of potassium chloride and/or other impurities such as trace metals. Potassium hydroxide is also available in various physical forms and any of these are suitably employed in the practice of the present invention such as pellet, flake, walnut-shaped briquettes and so forth.

It has been found that deionized resoles of the present invention derived from condensates which have been produced in the presence of potassium hydroxide made available as mercury cell grade, possess the further unexpected property of reproducibly providing phenolic foam of substantially reduced friability. The exact reason for this improvement in friability resistance and the mechanism by which it is brought about have not been elucidated. Illustrative of mercury cell grade potassium hydroxide for use as the condensation cayalyst in accordance with this particular embodiment of the present invention is that available from Hooker Chemical Corporation and Diamond Shamrock Chemical Company.

The alkaline phenol-formaldehyde condensate is aqueous, the water content thereof generally ranging between about 10 and about 60 weight percent, and is usually no more than about 40 to 50 weight percent. Water is introduced to the system as formaldehyde solution and is also introduced with the catalyst which is preferably added as a preformed aqueous solution. Varying amounts of water are also formed as by-product during the condensation reaction. Water present in the reaction system may be left in the condensate and passed as such to the above-described ion exchange reactions, or the condensate may be subjected to conventional techniques such as stripping to separate aqueous distillate and thereby reduce the water content to a predetermined level including a substantially non aqueous state. However, when the ion exchange reactions are effected employing individual beds of the respective exchange resins, the condensate should contain a sufficient amount of diluent prior to passage to the cation exchange reaction in order to minimize the polymerization of the resulting acidic material prior to removal of anions. For this purpose, the condensate should contain at least about 10, and usually at least about 20, weight percent of diluent. The diluent can be water introduced to the system as above-described, an added normally liquid, organic compound in which the resole is soluble, or a combination of water and added organic diluent. Suitable organic diluents include one or more of the following: alcohols such as, for example, isopropanol; ketones such as acetone and methyl ethyl ketone; water soluble ethers such as 1,2-dimethoxyethane (Monoglyme) and bis(2-methoxyethyl)ether (Diglyme); esters such as methyl acetate; acetals such as dimethoxymethane and the dimethyl acetal of acetaldehyde; hemiacetals; and other such oxygen-containing polar liquids in which the resole is also soluble. Other suitable diluents include normally liquid, halogenated aliphatic compounds in which the resole is soluble. The latter class of diluents are exemplified by methylene chloride, chloroform, 1,2-dichloroethane, tetrachloroethylene, 1-bromo-2-chloroethane, hexachloro-1,3-butadiene, and chlorinated derivatives of the aforesaid oxygen-containing diluents such as hexachloroacetone.

Concentration of liquid condensate to a particular water content is readily accomplished by conventional stripping at reduced pressure such as, for example, from about one to about 200 mm. mercury and temperatures from about 30° to about 75° C. Separation of aqueous distillate from condensate can be effected in several stages such as by effecting partial stripping prior to treatment with cation exchanger and further stripping after treatment with the anion exchanger, or in one stage such as after the anion exchange reaction.

It is to be understood, therefore, that although the alkaline condensate is aqueous, the deionized resoles of the invention can be provided as aqueous or non aqueous compositions including non aqueous compositions which are either in concentrated form or dissolved in one of the aforesaid organic solvents. An especially suitable method for providing the deionized resoles of the invention in anhydrous or substantially anhydrous form (0.5 weight percent water and less) comprises stripping alkaline condensate of aqueous distillate, adding isopropanol to the stripped condensate in an amount such that the combined weight of any remaining water and isopropanol is at least about 10 weight percent, subjecting the resulting mixture to the ion exchange reactions, and partially or completely stripping the deionized resole of isopropanol, as desired. During the latter operation, residual water is removed with isopropanol, thereby providing non aqueous products of the invention.

When the deionized resoles of the invention are to be used for manufacture of phenolic foam, the water content thereof as well as the content of any added organic diluent, is reduced to a final level of not more than about 10, and preferably not more than about 6, weight percent. Usually, the concentration of water is reduced to between about 4 and about 0.5 or less weight percent. Minimizing water contents of foaming resoles is desirable in order to minimize shrinkage of the foam product. The initial viscosity of the deionized resoles of the invention having such relatively low water contents, including the viscosity of non aqueous products, varies over a relatively wide range such as from about 400 up to about 150,000 centipoise (Brookfield at 25° C.), although usually initial viscosities are no higher than about 100,000 centipoise.

Although the deionized compositions and process of the present invention have been described with particular reference to the reaction of phenol itself and formaldehyde, it is to be understood that the teachings of this invention are also applicable to resole compositions derived from other phenolic compounds and aldehydes. For example, in addition to phenol itself, other compounds having a phenolic hydroxyl group (i.e., —OH bonded directly to a benzene nucleus) and from two to three unsubstituted ring carbon atoms in the ortho and para position to the phenolic hydroxyl group are suitable. Such compounds include mononuclear phenolic compounds as well as polynuclear phenolic compounds, that is, compounds having more than one benzene nucleus to which a phenolic hydroxyl group is bonded. For example, suitable mononuclear phenols are those compounds encompassed by the general formula,

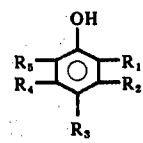

where $R_1$ through $R_5$ are hydrogen, hydroxyl or alkyl including any combination thereof, provided at least two of $R_1$, $R_3$ and $R_5$ are hydrogen. When present, the alkyl groups may have from one up to twenty carbon atoms. Illustrative of suitable compounds encompassed by the above formula are any of the following: phenol; resorcinol; catechol; ortho-, meta-, and para-cresols; 2,5-, 3,4- and 3,5-xylenols; 3-ethylphenol; 3,5-diethylphenol; and conventional para-substituted alkylphenols such as p-tert-butylphenol, p-amylphenol, p-nonylphenol, p-dodecylphenol, p-tetradecylphenol, p-octadecylphenol; and the like.

Illustrative of suitable dinuclear phenolic compounds are: 2,2-bis(4-hydroxyphenyl)propane, 2,2-bis(4-hydroxyphenyl)butane, and 2,2-bis(4-hydroxy-3-methylphenyl)-propane, which are also known to the art as Bisphenol A, B and C, respectively. Illustrative of other suitable polynuclear phenolic reactants are the following tri- and tetranuclear compounds which are the respective reaction products of phenol and acrolein (3:1 mole ratio) and of phenol and glyoxal (4:1 mole ratio);

and
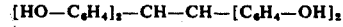

wherein the alkylidene bridging groups are linked to the respective benzene nuclei at the carbon atoms para to phenolic hydroxyl.

It is to be understood that any of the above phenolic reactants may be used individually or in combination. Usually, however, the para-substituted alkylphenols and/or polynuclear phenolic compounds are used in combination with phenol. Also contemplated as suitable for use in combination with phenol are one or more beta-phenylethyl substituted phenols such as, for example, ortho-(2-phenylethyl)-phenol, para-(2-phenylethyl)phenol, ortho,para-(2-phenylethyl)phenol and other such isomeric compounds. When phenol is used in combination with other phenolic compounds such as, for example, the aforementioned para-alkylphenols, betaphenylethylphenols and polynuclear phenols, the additional phenolic compound is usually used in an amount of no more than about 50 parts by weight per 100 parts by weight of phenol.

In addition to formaldehyde, other aldehydes which are useful in forming condensates from which the deionized phenolic resoles of the invention may be derived are: glyoxal, acetaldehyde, chloral, furfural and benzaldehyde. Further, formaldehyde may be used as free formaldehyde, usually added in aqueous solution as previously described, or in the form of its low molecular weight polymers such as paraformaldehyde or in the form of other substances capable of providing free formaldehyde under the condensation reaction conditions described herein. It is to be understood that any of the aforesaid aldehydes including formaldehyde may be used individually or in combination.

The stable, normally liquid, deionized phenolic resole compositions of the present invention are used with particular advantage in forming cellular phenolic products in slabstock (free-rise), molded, or spray-applied form by conventional foaming techniques. The density of the cellular products varies over a relatively wide range such as from about 0.2 to about 30 pounds per cubic foot. The density of the foam product derived from any given foam formulation is determined principally by the reactivity of the resole which, as previously defined herein, is the rate at which the foam polymer forms when the resole is subjected to acidic catalysts. Generally, for any given formulation, the lower the density of the foam product derived from a given resole, the more reactive is the resole and, likewise, the higher the density, the less reactive is the resole. Thus, density (as well as polymerization reaction time such as the cream and rise times) generally bear an inverse relationship to resole reactivity. It is to be understood that a very highly reactive deionized resole of the invention suitable for formation of foam having a density of less than about 0.5 pound per cubic foot such as the resoles prepared under a relatively mild combination of condensation conditions, may be blended with the less highly reactive deionized products, to obtain a particular reactivity suitable for producing foam having a desired density specification. Inasmuch as the deionized resoles of the invention have extended shelf-like due to their inherently greater stability towards self-polymerization, blends based on deionized resoles of different reactivities, also have good shelf-life.

For most end-use applications of the phenolic foam products derived from the deionized liquid resoles of the present invention, the other components of the foam formulations usually include an acidic catalyst, a blowing or foaming agent and a surface active agent.

The catalyst component of the foam formulation may be an inorganic acid or an organic acid and is usually a relatively strong acid. Illustrative of suitable acidic catalysts for foam polymer formation are any of the following: hydrochloric acid; sulfuric acid, fluoboric acid; formic acid; mixtures of acidic catalysts based on boric acid or its anhydride with organic hydroxy acids having a hydroxyl group on a carbon atom no more than one carbon atom removed from the carboxyl group such as, in particular, oxalic acid, as described in U.S. Pat. No. 3,298,973; and other acid catalysts known to the art of phenolic foam formation. Other suitable acidic catalysts are organic sulfonic acids such as any of the following which can be used individually or in combination with one another: benzene sulfonic acid, toluene sulfonic acid, xylene sulfonic acid, phenol sulfonic acid, ethane sulfonic acid, butane sulfonic acid and the like, as well as resin sulfonic acids such as the phenol-sulfuric acid-formaldehyde reaction products described in British Pat. No. 1,288,113. Illustrative of suitable mixtures of organic sulfonic acids for use as catalytic components of phenolic foam formulations containing the resoles of the present invention, are modified toluene sulfonic acids such as that available from Witco Chemical Company, Inc., as Ultra TX Acid and Sulframin TX Acid.

Overall, the concentration of catalyst contained in the foaming reaction mixture may vary between about 0.5 and about 40 parts by weight per 100 parts by weight of the deionized resole, and usually no more than about 20 parts is used. The preferred concentration varies with the nature of the catalyst. For example, fluoboric acid is an especially active catalyst for phenolic foam formation and thus is usually used in an amount of no more than about 10 parts per 100 parts of resole.

It is noted that some of the aforementioned acid catalysts are relatively non corrosive such as the organic sulfonic acids and boric acid-oxalic acid mixtures. However, when used in combination with conventional resoles supplied as foamable resins, salts contained in such resoles remain in the foam product and contribute to the corrosive nature of the phenolic foam product. On the other hand, a further characteristic and advantage of the resoles of the present invention is that they are inherently less corrosive than commercial resins due to their deionized state. Thus, their employment in combination with the non corrosive type of acid catalyst provides phenolic foam of lowered corrosiveness.

As the source of blowing action, any blowing agent known to the art of phenolic foam formation may be employed in conjunction with the deionized resoles of the invention. For example, one class of suitable blowing agents are the polyhalogenated saturated fluorocarbons having a boiling point within the range from about minus 40° F. up to about 200° F. described in U.S. Pat. No. 3,389,094. Illustrative of this class are trichloromonofluoromethane, 1,1,2-trichloro-1,2,2-triflurorethane ($CCl_2FCClF_2$), dichlorodifluoromethane, difluoroethane and 1,1,1,2-tetrachloro-2,2-difluoroethane. Other halogenated blowing agents are chlorohydrocarbons such as methylene chloride and 1,2-dichloroethane. Another class of suitable foaming agents are the aliphatic ethers having a boiling point between 30° C. and 100° C. such as diethyl ether, diisopropyl ether and other such compounds described in U.S. Pat. No. 2,845,396. The teachings of the latter patent and of said U.S. Pat. No. 3,389,094 in regard to other specific blowing agents are incorporated as part of the present disclosure by reference thereto. Generally, the blowing agent is used in an amount between about 2 and about 30 parts by weight per 100 parts by weight of resole contained in the foam formulation. More usually, between about 4 and about 16 parts is used.

One class of suitable surface active components of the phenolic foam formulations are organic surfactants. Particularly useful for this purpose are the non ionic organic surfactants such as condensation products of alkylene oxides (as illustrated by ethylene oxide, propylene oxide or combinations thereof) and alkylphenols such as nonylphenol, dodecylphenol and the like. Other suitable organic surface active agents are knonw to the phenolic foaming art and include, for example, those disclosed in U.S. Pat. No. 3,389,094, the teachings of which in this regard are incorporated as part of the present disclosure by reference thereto.

Another class of surface active agents are siloxane-oxyalkylene copolymers including those containing Si-O-C as well as Si-C linkages between the siloxane and oxyalkylene moieties. Typical siloxane-oxyalkylene copolymers contain a siloxane moiety composed of recurring dimethylsiloxy units endblocked with monomethylsiloxy and/or trimethylsiloxy units and at least one polyoxyalkylene chain composed of oxyethylene and/or oxypropylene units capped with an organic group such as alkyl. As specific examples of suitable siloxane-oxyalkylene polymers reference may be had to U.S. Pat. No. 3,271,331 the teachings of which in this regard are also incorporated herein by reference thereto.

Generally, the surface active agent is present in the foam formulations in an amount between about 0.5 and about 10 parts by weight per 100 parts by weight of the resole component.

The foaming of the resoles of this invention may also be carried out in the presence of other additives such as fillers, pigments, and compounds to render the foam product non punking. Especially suitable for this latter purpose are the phosphorus-containing compounds described in U.S. Pat. No. 3,673,130 such as, in particular, tetrakis(hydroxymethyl)phosphonium chloride.

In addition to their application in the formation of cellular phenolic resins, the deionized phenolic resoles of the invention are also useful for a multitude of other purposes such as, for example, in the manufacture of adhesives, coatings, films, cast thermosetting articles, and the like.

The following examples are set forth as illustrative of the present invention and are not to be construed as unduly limiting.

In the examples, the ion exchange resins employed are referred to, for the sake of brevity, as cation exchange Resins A and B and anion exchange Resin A. These respective resins are identified as follows:

Cation exchange Resin A is Rohm and Haas Company's free acid (H$^+$) form of Amberlite IR-120.

Cation exchange Resin B is Rohm and Haas Company's Amberlite IR-200 which, prior to use in the examples, was converted to its free acid form by the following procedure: About 1300 ml. of the IR-200 resin contained in a column (7 cm. I.D., 36 inches in length) is backflushed with one gallon of 4.0 weight percent hydrochloric acid, is then allowed to stand for 10–15 minutes while the resin bed settles, and is then flushed downwardly with distilled water (about 3–4 gallons) until the effluent is neutral to pH paper.

Anion exchange Resin A is Amberlite IRA-900 also marketed by Rohm and Haas Company. It is supplied in the chloride form and thus prior to use in the examples it was converted to the OH form substantially as follows: One gallon of the resin is slurried with 3 percent aqueous potassium hydroxide solution (one gallon) in a four-liter beaker for 30 minutes. The pH of the slurry is measured to ascertain alkalinity. The resin is then suction-filtered and washed batchwise with distilled water (about five gallons) until a constant neutral pH is obtained.

Spent ion exchange resins are converted to their respective free acid and hydroxyl forms following the above procedures with the exception that prior to regeneration, they were first washed by downflushing with about three to four times their volume of isopropanol in order to remove the organic resin (that is, the resole) which tends to coat the resin beads.

The potassium hydroxide catalyst employed in forming the condensates from which deionized Resoles A through H, J through Z and XX of the invention were derived, was that sold by J. T. Baker and Company as "Potassium Hydroxide Pellets, 'Baker Analyzed' Reagent" (purity, about 85–89 weight percent). The potassium hydroxide catalyst employed in forming the condensates from which deionized Resoles AA through EE of the invention were derived, is that available commercially as mercury cell grade 90%, and is described in greater detail with specific reference to the preparation of these particular resoles.

The values reported in the examples for the viscosity, pH, water and methylol contents of the resoles and the density of the foam products derived therefrom were determined as follows:

Viscosity, reported in centipoise (cps), was determined in Brookfield Viscometer Model LVT. Measurements were made by placing the resole sample in a constant temperature bath (25° C. unless indicated otherwise) for 16 hours, choosing a spindle to give a mid-range reading at 6–30 revolutions per minute. Readings were taken at 3, 4 and 5 minutes; the viscosity reported in the examples is the average of these three readings.

Foam density is reported in pounds per cubic feet (pcf) and was determined in accordance with ASTM procedure D-1632.

The pH determinations were made employing Beckman Zeromatic pH Meter (Beckman Instruments, Inc.), Model 96.

Water content of the resoles was determined in accordance with the method of Karl Fischer modified by the use of a Methyl Cellosolve solution of sulfur dioxide and iodine ($I_2$) as the titrating reagent standardized to a particular iodine factor (about 0.2) which is the grams of water consumed by 100 ml. of reagent. The as is further modified to determine the endpoint of the titration electrometrically using a milliampere meter. As the solvent medium, anhydrous methanol/redistilled pyridine (50 ml./75 ml.) is used. The titrating reagent is added to the solvent medium until the indicator of the meter holds at 150 milliamperes which is taken as the endpoint. The sample (0.5-1.0 gram) to be analyzed is then added and is titrated with the reagent until the indicator again holds at the 150 milliampere endpoint. The water content of the sample is then calculated as follows:

$$A \times \text{Iodine Factor/Grams of Sample} = \text{Weight Percent Water}$$

where A is the number of milliliters of titrating reagent required for the sample to reach the endpoint.

Methylol content was determined substantially as described in an article by R. W. Martin, entitled "Simple Methylol Determination," *Analytical Chemistry*, Vol. 23, No. 6, pages 883–884 (June 1951).

EXAMPLES 1–3

PREPARATION OF RESOLES A, B and C

In accordance with these examples, three resoles were prepared at a formaldehyde factor of 170 employing potassium hydroxide catalyst and effecting the phenol/formaldehyde condensation reaction for 3.25 hours at 75° C., followed by partial dehydration of the condensate, treatment with cation and anion exchange resins in sequence, and final stripping to remove additional water. Except as noted, the composition of the respective reaction mixtures and the procedure employed were substantially the same as illustrated by the following description of the preparation of Resole A.

A reaction vessel equipped with a Trubor stirrer, thermometer, nitrogen inlet and water-cooled distillation head was charged with (1) molten phenol (1600 grams; 17 moles) prepared by heating solid phenol overnight in an air oven at 55° C.; (2) 2740 grams of a 37.3 weight percent aqueous formaldehyde solution (Formalin) corresponding to 1022 grams (34 moles) of formaldehyde; and a solution containing 32.3 grams of potassium hydroxide (purity, 86.2%) dissolved in 188 grams of distilled water. The potassium hydroxide catalyst which was added with stirring, raised the pH of the phenol/formaldehyde solution from 3.3 to 8.7. After reducing the pressure of the system to 285 mm. Hg., the reaction mixture was heated to 65° C. which took about 20 minutes. At this point the heat was turned off and the exotherm of the mixture was allowed to reach its maximum temperature of 75° C. when a vigorous reflux commenced. The exotherm maintained a reflux at 75° C. (295–310 mm. Hg pressure) for about 40 minutes. Heat was then applied to hold the temperature at 75° C. (295–310 mm. Hg pressure) for a total condensation time (including the initial 40 minutes of reflux) of 3.25 hours. The pressure was then slowly reduced to 80 mm. Hg over period of 15 minutes while collecting aqueous distillate. Removal of aqueous distillate was continued for about 1.5 hours at 45°–50° C. (70–80 mm. Hg pressure) until about 70 grams of distillate per 100 grams of phenol had been collected. The warm (40° C.) partially dehydrated reaction mixture had a water content of about 25 weight percent and a pH of 8.5. It was then combined with 1000 grams of cation exchange Resin A. The resulting mixture was stirred until the pH stabilized at a value of 2.2 which took about 10 minutes. The cation exchange resin was removed by filtration through a fine weave cloth (Silkalene). The filtrate was next combined without undue delay with 300 grams of anion exchange Resin A until the pH reached 4.6 which took about 20 minutes. The mixture was then filtered through Silkalene. The filtrate had a pH of 4.7. To effect removal of volatiles including water, the filtrate was heated until a temperature of 65° C. at 40 mm. pressure was obtained which took about 6 hours. After this stripping operation, the liquid product was heated for about one hour at 65° C. under reduced pressure (40 mm. Hg). After the latter bodying step, the light yellow liquid product weighed 1900 grams corresponding to a yield of 117 grams per 100 grams of phenol. This product, which is designated herein as Resole A, had a Brookfield viscosity of 11,000 centipoise at 25° C., a free water content of 2.926 weight percent, a methylol ($-CH_2OH$) content of 13.94 weight percent, and a Hydroxyl No. of 252 mg. KOH/gram.

In Example 2, Resole B was prepared on twice the scale as Resole A. After addition of the potassium hydroxide catalyst, the pH of the reaction mixture was 8.65. After the condensation reaction, partial removal of water was effected until about 64 grams of aqueous distillate per 100 grams of phenol had been collected. The partially dehydrated reaction mixture (water content of about 25 weight percent) had a pH of 8.5 and was combined with 2000 grams of cation exchange Resin B. The resulting slurry was stirred until the pH stabilized at 3.0. After filtering to remove the cationic resin, the filtrate was combined with 750 grams of anion exchange Resin A until the pH of the slurry was 4.50. After separation of resin, the filtrate had a pH of 4.85. The final dehydration step was carried out for about 6.2 hours at 65° C. under reduced pressure (40 mm. Hg) after which the liquid product was allowed to cool to room temperature without heating further under these conditions. The liquid product was obtained in a yield of 119.9 grams per 100 grams of phenol. This product, which is designated herein as Resole B, had a viscosity of 12,800 centipoise at 25° C., a free water content of 3.23 weight percent, a methylol content of 18.37 weight percent, and a Hydroxyl No. of 341 mg. KOH/gram.

In Example 3, Resole C was prepared on the same scale as Resole A except that 600 grams of anion exchange Resin A was used. After addition of the potassium hydroxide catalyst, the pH of the reaction mixture was also 8.7. The partial water removal step after condensation was effected until about 70.9 grams of distillate per 100 grams of phenol had been collected. The partially dehydrated reaction mixture, having a pH of 8.55, was combined with 1000 grams of cation exchange Resin A and the resulting slurry was stirred until the pH stabilized at 2.35 which took about 5 minutes. After the filtration step, the filtrate was combined with anion exchange Resin A (600 grams) until the pH of the slurry was brought to 5.45 instead of 4.6 as in Example 1. After separation of the anion exchange resin, the filtrate had a pH of 5.40. The finaldehydration step was carried out by stripping the reaction product for a total of 3.5 hours at 65° C. under reduced pressure (40 mm. Hg) and was then allowed to cool to room temperature without further heating under these conditions. The liquid product was obtained in a yield of 119.1 grams per 100 grams of phenol. This product, which is designated herein as Resole C, had a viscosity of 6,710 centipoise at 25° C.

EXAMPLE 4–6

In accordance with part (A) of these examples, Resoles A, B and C were heat-aged for various periods of time and, as described under part (B), foams were prepared from these resoled both before and after heat aging.

A. Heat Aging Procedure

Heat aging of Resoles A, B and C was conducted under nitrogen at 65° C. and atmospheric pressure, employing substantially the same procedure which is typified by the following description of heat aging of Resole A:

Approximately 1400 grams of Resole A was placed in a 5-liter, 4-necked flask equipped with a stirrer, thermometer, nitrogen inlet tube and reflux condenser. The resole was heated at 65° C. for 6 hours under nitrogen (Example 4-1). After this initial aging period, a portion (about 450 grams) of the resole, designated A-1, was removed from the flask for foaming and viscosity determinations. The remaining resole in the flask was subjected to a second heating stage (Example 4-2) and was further heat aged for an additional 4.5 hours at 65° C. A portion of the resole, designated A-2, which had now been heat aged for a total of 10.5 hours, was removed from the flask for foaming and viscosity measurements. The resoleremaining in the flask was heat aged at 65° C. for an additional period of 5 hours (Example 4-3). The remaining resole, now designated A-3, had thus been aged for a total of 15.5 hours and was also tested for foaming behavior and its viscosity measured.

Resoles B and C were also subjected to three heat aging stages for various periods of time. After each stage, the respective resoles, designated B-1, B-2, B-3, C-1, C-2, and C-3, were tested for foaming behavior and viscosity determinations.

B. Foaming Reaction and Procedure

The foam formulation employed in preparing foams based on Resoles A, B and C both before and after heat aging, had the composition given in the following Table I.

TABLE I

FOAM FORMULATION A

| Component | Parts By Weight |
|---|---|
| Resole | 300 |
| Silicone Surfactant /1/ | 3 |
| Blowing Agent /2/ | 20 |
| Fluoboric Acid as a 48 weight per cent aqueous solution | 9 |

/1/ Polysiloxane-polyoxyalkylene block copolymer having the average composition $$Me_3SiO[Me_2SiO]_{43}[MeSiO]_{6.7}SiMe_3$$
$$\quad\quad\quad\quad\quad\quad\quad\quad\quad |$$
$$MeO(C_3H_6O)_{5.7}(C_2H_4O)_{22.6}C_3H_6$$

where Me represents methyl.
/2/ 1,1,2-trichloro-1,2,2-trifluoroethane.

The foams were prepared in accordance with the following general procedure. A one-quart cardboard cup containing the resole, silicone surfactant and blowing agent were first thoroughly premixed by stirring for about 60 seconds at about 1700 revolutions per minute with an air driven motor equipped with a stainless steel shaft containing three stainless steel paddles; the temperature of this mixture is within the range of 27° to 30° C. The weighed amount of catalyst is then poured on top of the premixture and the whole stirred vigorously for 20 seconds. The resultant blend is poured into a cardboard box (8 × 8 × 6inches), the cream and rise times (in seconds) recorded, and the height (in inches) measured. The cream time is taken as the time from catalyst addition until the blend visibly begins to expand. Rise time is measured from the time of catalyst addition until expansion ceases. The height of rise is measured as of the indicated rise time. The foam are allowed to stand under ambient conditions for at least three days before cutting and testing.

The results including time aged, and the viscosity, cream and rise times and foam density before and after aging are given in Table II.

within the range of 2300 to 6600 centipoise, a water content of 5.5 to 7 weight percent, a pH from 5.6 to 6.4, and a medium foam density of about 2 to 2.5 pcf. Typical condensation conditions for manufacture of this grade of foaming resole include: a formaldehyde factor of 170 (based on 37 weight percent aqueous formaldehyde); a condensation temperature of about 75° C.; a reaction time of about 3.25 hours; and the employment of barium hydroxide octahydrate as the catalyst (3.6 parts by weight per 100 parts by weight of phenol). The alkaline condensate is partially dehydrated (about 70 grams of distillate per 100 grams of phenol), and is neutralized with dilute (12 weight percent) sulfuric acid. The resulting solubilized barium salt is probably in a solvated form and, in any event, remains in the resole as a component thereof. This grade of resole is heat reactive even at ordinary ambient conditions and thus is normally shipped and stored under refrigeration (5° C.) in order to minimize self-condensation to higher molecular weight components and concomitant loss in reactivity as a foamable composition. The particular batch of this commercially produced resole employed in comparative Run C-1 is designated herein as Resole I and, as manufactured, had a viscosity of 4650 centipoise, a water content of 5.6 weight percent, a pH of 5.9, and a foam density specification of 2.3 pcf. Prior to use in Run C-1, Resole I was kept under refrigeration.

As with deionized Resoles A, B and C of the invention, comparative Resole I was also heat aged at 65° C. for various periods of time following the above aging procedure, designating Resole I after each of the three aging periods as Resoles I-1, I-2 and I-3, respectively. Viscosity of Resole I prior to and after each aging stage was measured as was resole reactivity. The respective foams were prepared following the above-described general foaming procedure and Foam Formulation A of Table I. These results are also given in Table II which follows.

TABLE II

EFFECT OF HEAT AGING AT 65° C. ON RESOLE VISCOSITY AND REACTIVITY

| Example | Resole | Total Hours Heat Aged | Brookfield Viscosity cps. (25° C.) | Cream Time (seconds) | Foam Reactivity /1/ Rise Time (seconds) | Rise (inches) | Foam Density (pcf) |
|---|---|---|---|---|---|---|---|
| 4 | A /2/ | 0 | 11,000 | 25 | 70 | 9 | 1.18 |
| 4-1 | A-1 | 6 | 12,234 | 55 | 110 | 6 | 1.72 |
| 4-2 | A-2 | 10.5 | 16,400 | 60 | 130 | 7 | 1.70 |
| 4-3 | A-3 | 15.5 | 28,880 | 80 | 150 | 5.5 | 1.78 |
| 5 | B /2/ | 0 | 12,800 | 45 | 95 | 7 | 1.34 |
| 5-1 | B-1 | 5 | 14,520 | 55 | 105 | 7 | 1.45 |
| 5-2 | B-2 | 11.5 | 20,892 | 85 | 175 | 5.5 | 1.69 |
| 5-3 | B-3 | 18 | 26,000 | 85 | 165 | 5.5 | 1.95 |
| 6 | C /2/ | 0 | 6,710 | 75 | 140 | 6 | 1.50 |
| 6-1 | C-1 | 5.5 | 8,180 | 80 | 170 | 6 | 1.70 |
| 6-2 | C-2 | 12.0 | 11,040 | 100 | 210 | 5 | 1.87 |
| 6-3 | C-3 | 18.5 | 16,200 | 110 | 220 | 5 | 2.05 |
| Run |  |  |  |  |  |  |  |
| C-1 | I /3/ | 0 | 5,350 | 130 | 530 | 3 /4/ | 2.84 |
| C-1a | I-1 | 5 | 8,420 | 220 | 670 | 2 /5/ | 4.11 |
| C-1b | I-2 | 11.5 | 11,974 | 330 | 660 | rose 1"and collapsed |  |
| C-1c | I-3 | 18.0 | 34,800 | No foam; mixture did not rise at all |  |  |  |

/1/ Foam Formulation A of Table I.
/2/ Condensation conditions: formaldehyde factor, 170; KOH concentration, 2 weight percent (basis phenol); condensation temperature, 75° C.; and condensation time, 3.25 hours.
/3/ A commercially employed resole not of the present invention; alkaline catalyst neutralized with acid.
/4/ 10 percent shrinkage.
/5/ 20 percent shrinkage.

COMPARATIVE RUN C-1

For the purpose of comparison, Table II also includes data as Run C-1 based on a commercially produced phenol-formaldehyde foaming resole of a grade designed to have the following specifications: a viscosity The form data of Table II, all of which are based on Foam Formulation A, show that Resoles A-C of the invention had excellent reactivity as foamable materials both initially and after accelerated aging. I contrast, Resole I exhibited a significantly lower initial reactivity (Run C-1) and poor aging characteristics, as reflected, in particular, by a foam density of 4.11 pcf after only 5 hours of heat aging.

EXAMPLES 7 and 8

PREPARATION OF RESOLES D AND E

In these examples, two resoles were prepared at a formaldehyde factor of 170 using the same amounts of phenol, formaldehyde, and aqueous solution of potassium hydroxide catalyst used in preparing Resole A of Example 1. After addition of the catalyst, the pH of the reaction mixtures was 8.7. The condensation was carried out substantially as described in Example 1 except that the total condensation time at 75° C. was 4.25 hours instead of 3.25 hours. Partial removal of water was effected under reduced pressure (about 80 mm. Hg) until about 70.2 grams (Example 7) and 69.2 grams (Example 8) of distillate per 100 grams of phenol had been collected, respectively. The partially dehydrated reaction mixtures, while at 45° C. (Example 7) and 35° C. (Example 8), had pH values of 8.0 and 8.15, respectively.

In the preparation of Resole D of Example 7, the partially dehydrated mixture was combined with 1000 grams of cation exchange Resin A, and the resulting slurry was stirred until the pH stabilized at a value of 2.3 which took about 15 minutes. The cation exchange resin was removed by filtration and the filtrate was then combined with 1000 grams of anion exchange Resin A until the pH of the slurry reached 4.85 which took about 17 minutes. After filtration, the filtrate had a pH of 4.9 and was heated at 65° C. under reduced pressure (40 mm. Hg) for about 5.0 hours to effect removal of volatiles including water. After this stripping operation, the liquid product was heated for about 0.5 hour at 65° C. under reduced pressure (40 mm. Hg). The liquid product was obtained in a yield of 117.1 grams per 100 grams of phenol. This product, designated herein as Resole D, had a Brookfield viscosity of 16,500 centipoise at 25° C.

In the preparation of Resole E of Example 8, the partially dehydrated mixture was combined with 1000 grams of cation exchange Resin A, and the resulting slurry was stirred until the pH stabilized at a value of 2.4 which took about 15 minutes. The cation exchange resin was removed by filtration and the filtrate was then combined with 800 grams of anion exchange Resin A until the pH reached 5.45 which took about 10 minutes. After filtration to remove the anionic resin, the filtrate had a pH of 5.40. The filtrate was heated at 65° C. under reduced pressure (40 mm. Hg) for about 3.5 hours to effect removal of volatiles including water. After this stripping operation, the liquid product was obtained in a yield of 122.3 grams per 100 grams of phenol. This product is designated herein as Resole E and had a viscosity of 11,120 centipoise at 25° C.

EXAMPLE 9

PREPARATION OF RESOLE F

In accordance with this example, a further resole was prepared at a formaldehyde factor of 170 employing the same amounts of phenol, formaldehyde and aqueous solution of potassium hydroxide catalyst used in preparing Resole A of Example 1. After addition of the catalyst, the pH of the reaction mixture was 8.65. The condensation was carried out substantially as described in Example 1 except that the total condensation time at 75° C. was 2.25 hours instead of 3.25 hours. Partial removal of water was effected under reduced pressure (about 80 mm. Hg) until about 62.9 grams of distillate per 100 grams of phenol had been collected. After cooling to 45° C., the pH of the partially dehydrated mixture was 850 grams of cation exchange Resin B. The resulting slurry was stirred until the pH stabilized at a value of 3.4 which took about 30 minutes, after which 450 grams of cation exchange Resin A was added to achieve a pH of 2.7 which took about 15 minutes. After removal of the cation exchange resins by filtration, the filtrate was combined with 400 grams of anion exchange Resin A until the pH reached 5.30 which took about 26 minutes. After filtration, the filtrate had a pH of 5.30 and was heated at 65° C. under reduced pressure (40 mm. Hg) for about 5.5 hours to effect removal of volatiles including water. After this stripping operation, the liquid product was heated for about 2¼ hours at 65° C. under reduced pressure (40 mm.). The liquid product was obtained in a yield of 118 grams per 100 grams of phenol. This product, designated herein as Resole F, had a viscosity of 6500 centipoise at 25° C.

EXAMPLE 10

PREPARATION OF THE RESOLE G

In accordance with this example, a resole was prepared at a formaldehyde factor of 170 employing the same amounts of phenol, formaldehyde and aqueous solution of potassium hydroxide catalyst used in preparing Resole A of Example 1. After addition of the catalyst, the pH of the reaction mixture was 8.7. The condensation was carried out substantially as described in Example 1 except that the total condensation time at 75° C. was 5.25 hours instead of 3.25 hours. Partial removal of water was effected under reduced pressure (about 80 mm. Hg) until about 62.8 grams of distillate per 100 grams of phenol has been collected. After cooling to room temperature, the pH of the partially dehydrated condensate was 8.6. It was then combined with 1000 grams of cation exchange Resin A, and the resulting slurry was stirred until the pH stabilized at a value of 2.3 which took about 13 minutes. The cation exchange resin was removed by filtration and the filtration was then combined with 600 grams of anion exchange Resin A untthe pH reached 5.40 which took about 15 minutes. After filtration to remove the anionic resin, the filtrate also had a pH of 5.40. The latter filtrate was heated at 65° C. under reduced pressure (40 mm. Hg) for about 5¼ hours to effect removal of volatiles including water, after which the product was allowed to cool to room temperature. The liquid product was obtained in a yield of 121.5 grams per 100 grams of phenol. This product, designated herein as Resole G, had a Brookfield viscosity of 37,600 centipoise at 25° C.

EXAMPLES 11–14

In accordance with these examples, Resoles D through G, respectively, were heat aged at 65° C. and atmospheric pressure under nitrogen following the procedure described above under part (A) of Examples 4–6. The foaming behavior of the resoles prior to and after heat aging was determined employing Foam Formulation A of Table I, and the procedure described under part (B) of Examples 4–6. The results of the aging study and the foam data are given in Table III which follows.

foaming procedure. The foam data are also given in Table IV which follows.

TABLE IV

COMPARATIVE DATA

| Run No. | C-2 | C-2a | C-2b | C-3 | C-3a |
|---|---|---|---|---|---|
| Resole | II /1/ | II-1 | II-2 | III /1/ | III-1 |
| Total Hours Aged at 65° C. | 0 | 7.0 | 13.0 | 0 | 7 |
| Brookfield Viscosity After Aging Period, cps. at 25° C. | 58,000 | 66,500 | 147,000 | 552,000 | 1,160,000 |
| Foam Reactivity /2/ | | | | | |
| Cream Time, seconds | 60 | 110 | NO | TOO VISCOUS | |
| Rise Time, seconds | 140 | 230 | | TO FOAM | |
| Rise, inches | 6 | 3.5 /3/ | FOAM | | |
| Foam Density, pcf. | 2.11 | 2.63 | | | |

/1/ Not resoles of the invention. Condensates prepared at a formaldehyde factor of 170 and temperature of 75° C. for 3.25 hours (Resole II) and 4.25 hours (Resole III) and treated with cation exchange resin followed by addition of alkaline catalyst to final pH of 4.70.
/2/ Foam Formulation A of Table I.
/3/ Shrinkage and surface cracks.

The results of Table IV show that adjustment of pH of cation exchanged condensate by adding back the alkaline metal condensation catalyst as in the preparation of Resoles II and III impairs the aging characteristics and processability of the resole product. Thus, after a total aging period of 13 hours (Run C-2b), Resole II-2 did not provide a foam when employed as the resole component of Foam Formulation A. The latter conclusion is based on the observation that, although some reactivity was indicated by a rise of three inches in some areas of the foam formulation, foaming behavior was unsatisfactory; the high viscosity of 147,000 centipoise may also explain why Resole II-2 did not foam. On the other hand, as shown by the series of aging data of Example 4 of Table II, deionized Resole A of the invention which also had been condensed at a formaldehyde factor of 170 for 3.25 hours at 75° C. and brought to a final pH of 4.7 (by treatment with anion exchange resin) had superior aging characteristics and markedly lower initial viscosity, which, although enhanced during aging, was still at a processable level. Further, Resole III which has been prepared at the higher condensation time of 4.25 hours (that is, the same time employed in providing Resole D of Example 7), had such a high viscosity initially (552,000 centipoise) that it could not be foamed employing standard Foam Formulation A, and became a "taffy-like" material (viscosity over one million centipoise) after only 7 hours of heat aging. In contrast and as shown by the data of Example 11 of Table III, Resole D of the present invention had good aging characteristics and foam reactivity.

EXAMPLES 15–18

Preparation of Resoles H, J, K and L

In accordance with these examples, additional phenol-formaldehyde condensates were prepared at condensation times from 3.25 to 6.25 hours and 75° C. substantially as described above with respect to Resoles A-G except that, instead of effecting condensation at a formaldehyde factor of 170, the factor was about 120, based on 37.3 weight percent formaldehyde. More particularly, in each preparation the starting materials were as follows: 1882 grams (20 moles) of phenol, 2413 grams of 37.3 weight per cent aqueous formaldehyde (30 moles HCHO), and 32.3 grams of potassium hydroxide (purity, 86.2%) dissolved in 188 grams of distilled water. Upon addition of the aqueous catalyst solution, the reaction mixtures had respective pH values of 8.80, 8.85, 8.75 and 8.70. The respective reaction mixtures were condensed at 75° C. for 3.25 hours (Resole H), 4.25 hours (Resole J), 5.25 hours (Resole K) and 6.25 hours (Resole L). The condensates were then partially dehydrated at 45°–65° C. and 80–45 mm. Hg pressure until the water content was brought to a level of approximately 25 weight per cent. The partially dehydrated condensates were then slurried at room temperature with 1000 grams of cation exchange Resin A and stirred for 40–45 minutes during which time the pH decreased to the values given in Table V below. After separating the cationic resin by filtration, the filtrates were combined with 300 grams of anion exchange Resin A and the resulting slurries were stirred until the respective pH values rose to 4.55 to 4.6 as also indicated in Table V. The anionic resin was then separated by filtration, the filtrates having the pH given in Table V which follows.

TABLE V

| Resole | H | J | K | L |
|---|---|---|---|---|
| pH After Partial Stripping of Condensate | 8.5 | 8.7 | 7.85 | 7.75 |
| pH After Treatment With Cationic Resin | 2.4 | 2.35 | 2.35 | 2.35 |
| pH After Treatment With Anionic Resin | | | | |
| Slurry | 4.6 | 4.6 | 4.55 | 4.55 |
| Filtrate | 4.77 | 4.70 | 4.75 | 4.75 |

The respective filtrates were stripped of additional water at 65° C. (about 40 mm. pressure) over a period of 6 hours (Resoles H and J), 4 hours (Resole K) and 3.75 hours (Resole L) after which they were allowed to cool to room temperature. Their viscosity and foaming behavior both before and after heat aging were determined as described under the following examples.

EXAMPLES 19–22

Resoles H, J, K and L were subjected to heat aging at 65° C. and atmospheric pressure for various periods of time following the procedure of part (A) of Examples 4-6 above. Prior to and after each aging period, samples were employed as the resole component of Foam Formulation A (Table I) following the procedure described under part (B) of Examples 4–6. The length of each heating period, viscosity measurements and the foam reactivity data are given in Table VI which follows.

TABLE III

EFFECT OF HEAT AGING AT 65° C. ON RESOLE VISCOSITY AND REACTIVITY

| Example | Resole | Conden- sation Time (hrs.) | Total Hours Heat Aged | Brookfield Viscosity cps. (25° C.) | Foam Reactivity /1/ | | | Foam Density (pcf) |
|---|---|---|---|---|---|---|---|---|
| | | | | | Cream Time (sec.) | Rise Time (sec.) | Rise (in.) | |
| 11 | D /2/ | 4.25 | 0 | 16,500 | 30 | 100 | 7 | 1.62 |
| 11-1 | D-1 | | 6 | 26,348 | 95 | 190 | 5 | 2.32 |
| 11-2 | D-2 | | 10.5 | 34,800 | 105 | 230 | 4.5 | 2.58 |
| 11-3 | D-3 | | 15.5 | 64,500 | 140 | 270 | 3.5 | 2.26 |
| 12 | E /2/ | 4.25 | 0 | 11,120 | 80 | 160 | 5 | 1.84 |
| 12-1 | E-1 | | 5.5 | 14,700 | 120 | 280 | 4 | 2.42 |
| 12-2 | E-2 | | 12 | 19,332 | 165 | 320 | 3.5 | 2.82 |
| 12-3 | E-3 | | 18.5 | 46,900 | 220 | 420 | 2 | /3/ |
| 13 | F /2/ | 2.25 | 0 | 6,500 | 30 | 60 | 12 | 1.00 |
| 13-1 | F-1 | | 3 | 7,520 | 30 | 65 | 10 | 1.01 |
| 13-2 | F-2 | | 8 | 10,300 | 45 | 80 | 11 | 1.11 |
| 14 | G /2/ | 5.25 | 0 | 37,600 | 70 | 140 | 4.5 | 2.40 |
| 14-1 | G-1 | | 5 | 60,170 | 75 | 220 | 4.0 | 2.92 |

/1/ Foam Formulation A of Table I.
/2/ Condensation conditions: formaldehyde factor, 170; KOH concentration, 2 weight percent (basis phenol); condensation temperature, 75° C.; condensation time, as indicated.
/3/ Shrinkage one inch; hard; surface cracks.

Overall, the data of Table III demonstrate that the ion exchanged resoles of the invention derived from condensates which had been condensed for shorter and longer periods of time than the 3.25 hours employed in forming Resoles A, B and C, also had good aging properties and foam reactivity. The data also show that at a formaldehyde factor of 170, lowering the severity of the condensation conditions such as by reducing the condensation time to 2.25 hours (Resole F), provides resoles which, when subsequently deionized as described herein, are capable of being foamed to low density foam (such as the one pcf foam produced in Example 13) by controllable pour-in-place reactions. The data also show that resoles of the invention desired for formation of higher density foam, are obtainable by effecting the condensation reaction under a more severe combination of conditions such as by extended condensation times of 4.25 and 5.25 hours employed in producing the condensates from which Resoles D, E and G were derived. The reason for the apparently anomalous result of Example 12-3 based on aged Resole E-3 is not evident in view of the results obtained with aged Resole D-3 employed in Example 11-3. Although Resole D-3 had a substantially higher viscosity (64,500 centipoise) after 15.5 hours of accelerated aging than the viscosity (46,900 centipoise) of Resole E-3 after 18.5 hours, it did not exhibit a corresponding loss in reactivity as indicated by the 2.26 pcf density of the foam produced therefrom.

Comparative Resoles II and III and Runs C-2 and C-3

For the purpose of comparison, two resoles which are not of the present invention were prepared by treating phenol-formaldehyde condensate (formaldehyde factor of 170, basis 37.3 Formalin) with cation exchange resin to a pH of 2.65 but, in lieu of subsequent treatment with anion exchange resin, the final pH of the resole was brought to 4.7 by neutralization with alkaline condensation catalyst. These particular resoles are referred to herein as Resoles II and III. Of interest in connection with these particular resoles is U.S. Pat. No. 2,865,875. That patent is concerned with the preparation of base-catalyzed phenol-formaldehyde resins having reasonable shelf-life which latter term, however, as used by the patentee, denotes " a resin solution which will remain water-soluble without precipitation or gelation for a reasonable length of time" (column 1, lines 50–53). For the purpose of providing resoles having such "water tolerance," the patentee suggests reduction in the alkali derived from the catalyst employed in phenol-formaldehyde condensation by treatment of condensate with a cation exchange resin to adjust the pH to between 4 and 8 either by controlling the extent of exposure to the cation exchanger or "by carrying the pH below 4 with subsequent addition of alkali" (column 4, lines 26–28). In the latter event, the alkali which is added can be the same as originally used to catalyze the condensation reaction or a "volatile alkali" can be used such as an amine. Although the patentee is not concerned with shelf-life of resules from the standpoint of their reactivity as foamable compositions, it was nevertheless of interest to prepare and determine the aging characteristics of aforementioned Resoles II and III.

More particularly, in the preparation of Resoles II and III, reaction mixtures containing the following were used: phenol (1600 grams; 17 moles); formaldehyde (34 moles) added as 2740 grams of a 37.3 weight percent aqueous solution; barium hydroxide monohydrate (57.6 grams) as the catalyst; and 230 grams of distilled water. The respective mixtures were heated at 75° C. for 3.25 hours (Resole II) and 4.25 hours (Resole III). Upon addition of the barium hydroxide catalyst, the reaction mixtures had respective pH values of 8.65 and 8.75. After partial dehydration (65.6 and 63.3 grams of distillate per 100 grams of phenol, respectively), the reaction mixtures had a pH of 7.8 (Resole II) and 7.70 (Resole III) at 40° C. Each resole was then slurried with 1000 grams of cation exchange Resin A until the pH stabilized at 2.65. In each run, the pH of the resole was adjusted to a value of 4.70 by the addition of 38 grams (Resole II) and 40 grams (Resole III) of 10 weight percent aqueous barium hydroxide monohydrate. The resoles were then stripped of water at 45–65° C. and 80–45 mm. Hg pressure over a period of about 4 hours. The liquid products, designated Resoles II and III, were obtained in yields of about 141 grams per 100 grams of phenol, and were heat aged under nitrogen at 65° C. and atmospheric pressure following the above-described heat aging procedure, for the periods of time given in Table IV below. The latter table also sets-forth the viscosity of the resoles as prepared and after each aging period. Samples of the aged products were then employed as the resole component of Foam Formulation A of Table I above following the above-described

TABLE VI

EFFECT OF HEAT AGING AT 65° C. ON RESOLE VISCOSITY AND REACTIVITY (FACTOR 120)

| Example | Resole | Condensation Time (hrs.) | Total Hours Heat Aged | Brookfield Viscosity cps. (25° C.) | Foam Reactivity /1/ Cream Time (sec.) | Rise Time (sec.) | Rise (in.) | Foam Density (pcf) |
|---|---|---|---|---|---|---|---|---|
| 19 | H | 3.25 | 0 | 5440 | 27 | 50 | 16 | 0.66 |
| 19-1 | H-1 | | 6.5 | 5870 | 37 | 60 | 5 /2/ | 0.79 |
| 19-2 | H-2 | | 13.5 | 7000 | 50 | 83 | 15 | 0.78 |
| 19-3 | H-3 | | 20.5 | 8780 | 60 | 95 | 11 | 0.85 |
| 20 | J | 4.25 | 0 | 11,996 | 30 | 50 | 15 | 0.76 |
| 20-1 | J-1 | | 6.5 | 14,314 | 40 | 65 | 12 | 0.87 |
| 20-2 | J-2 | | 13.5 | 18,240 | 45 | 80 | 13 | 0.97 |
| 20-3 | J-3 | | 20.5 /3/ | 40,800 | 65 | 115 | 8 | 1.21 |
| 21 | K | 5.25 | 0 | 85,700 | 20 | 40 | 8 /4/ | 1.23 |
| 21-1 | K-1 | | 7 | 157,200 | 100 | 200 | 6 /4/ | 1.85 |
| 21-2 | K-2 | | 14 | 254,000 | 105 | 210 | 6 /5/ | 1.81 |
| 22 | L | 6.25 | 0 | 46,300 | 42 | 85 | 7 /4/ | 1.30 |
| 22-1 | L-1 | | 7 | 70,100 | 50 | 180 | 7 /4/ | 1.75 |
| 22-2 | L-2 | | 14 | 134,000 | 75 | 240 | 5 /6/ | /6/ |

/1/ Foam Formulation A of Table I.
/2/ Foam produced on one-half the scale of foam of Example 19.
/3/ During this heat aging stage the temperature rose to 105° C. for 20 minutes.
/4/ Slight shrinkage of foam and surface cracks.
/5/ Slight shrinkage of foam.
/6/ Slight shrinkage but poor quality foam having large voids throughout making average density low (1.67); estimated density = 1.80 pcf.

Inspection of the results of Table VI show that when the condensation reaction is effected at a phenolformaldehyde factor of 120, low viscosity, highly reactive resoles having excellent heat aging characteristics are provided at condensation times of 3.25 and 4.25 hours, as employed in the preparation of Resoles H and J. The high reactivity of Resoles H and J is reflected, in particular, by the low density of the foam products. Notwithstanding their high reactivity, Resoles H and J allowed for the formation of a controllable pour-in-place foaming reaction at ambient temperature. Resoles K and L were also condensed at a phenol-formaldehyde factor of 120 but for longer condensation times (5.25 and 6.25 hours). Although Resoles K and L exhibited good reactivity prior to and after heat aging. The high viscosity of these particular resoles hampered proper mixing of the fluoboric acid catalyst and silicone surfactant and thus, although only slight shrinkage was observed, overall foam rise was uneven and the foams were of poorer quality than the foams provided from Resoles H and J. It is evident, therefore, that when the condensation reaction is effected at 75° C. and a formaldehyde factor of 120, prolonged condensation times (5.25–6.25 hours) should be avoided.

EXAMPLES 23-33

In accordance with these examples, phenolformaldehyde resoles, designated herein as Resoles M through W, were prepared at a phenol-formaldehyde factor of 170 with variation in condensation temperature (75°-90° C.), condensation time (3.25–10 hours) and catalyst concentration (0.5–1.5 weight percent, basis phenol). In each preparation, the following were employed: 1600 grams of phenol; 2740 grams of a 37.3 weight percent aqueous formaldehyde solution; and a catalyst solution containing potassium hydroxide (purity, 86.2%) dissolved in 188 grams of distilled water. The particular amount of potassium hydroxide and condensation conditions employed in each preparation are given in Table VIII below. Following substantially the same manipulative procedure described, for example, under Example 1, the respective condensates were: partially dehydrated; treated with cation exchange Resin A; filtered; treated with anion exchange Resin A; filtered; and stripped to remove additional aqueous distillate. The amount of ion exchange resins employed and the pH of the filtrates after each ion exchange treatment are also given in Table VIII. The viscosity of each resole was measured and at least one resole prepared at the various temperatures was analyzed to determine its water and —$CH_2OH$ contents. Each of Resoles M through W was then employed as the resole component of the following foam formulation:

TABLE VII

| FOAM FORMULATION B | |
|---|---|
| Component | Parts By Weight |
| Resole | 300 |
| Silicone Surfactant /1/ | 3 |
| Blowing Agent /1/ | 39 |
| Fluoboric Acid as a 48 weight percent aqueous solution | 9 |

/1/ as defined in Table I.

The foams were prepared following the procedure described under part (B) of Examples 4–6 hereinabove. The density of the respective foam products as well as the other aforementioned data are given in Table VIII which follows.

TABLE VIII

PREPARATION OF ION-EXCHANGED RESOLES M-W

| Example No. | 23 | 24 | 25 | 26 | 27 | 28 | 29 | 30 | 31 | 32 | 33 |
|---|---|---|---|---|---|---|---|---|---|---|---|
| Resole Designation | M | N | O | P | Q | R | S | T | U | V | W |
| Condensation Conditions | | | | | | | | | | | |
| Temperature, ° C. /1/ | 75 | 75 | 75 | 80 | 85 | 90 | 75 | 80 | 85 | 85 | 75 |
| Time, hours | 3.25 | 6.5 | 10 | 3.25 | 3.25 | 3.25 | 3.25 | 3.25 | 3.25 | 3.25 | 3.25 |
| KOH, grams | 8 | 8 | 8 | 8 | 8 | 8 | 16 | 16 | 16 | 16 | 24 |
| Weight percent, basis phenol | 0.5 | 0.5 | 0.5 | 0.5 | 0.5 | 0.5 | 1 | 1 | 1 | 1 | 1.5 |
| Partial Stripping of Condensate /2/ | | | | | | | | | | | |
| cc. Aqueous Distillate Collected | 1120 | 1010 | 975 | 1040 | 970 | 960 | 1325 | 1100 | 1050 | 1010 | 1140 |
| pH of Partially Stripped Condensate | 7.3 | 7.1 | 6.9 | 7.2 | 7.25 | 7.05 | 7.4 | 7.7 | 7.5 | 7.45 | 7.7 |
| Treatment With Cation Exchange Resin A | | | | | | | | | | | |

TABLE VIII-continued

| | PREPARATION OF ION-EXCHANGED RESOLES M-W | | | | | | | | | | |
|---|---|---|---|---|---|---|---|---|---|---|---|
| grams of Resin | 100 | 125 | 125 | 125 | 125 | 120 | 200 | 250 | 250 | 250 | 300 |
| pH of Filtrate | 3.85 | 3.8 | 3.8 | 2.0 | 2.0 | 2.10 | 3.7 | 1.9 | 2.1 | 2.0 | 3.3 |
| Treatment With Anion Exchange Resin A | | | | | | | | | | | |
| grams of Resin | 150 | 200 | 200 | 450 | 650 | 650 | 250 | 500 | 550 | 650 | 200 |
| pH of Filtrate | 4.6 | 4.7 | 4.7 | 4.6 | 4.2 | 4.5 | 4.7 | 4.4 | 4.3 | 4.35 | 4.5 |
| Final Stripping of Resole /3/ | | | | | | | | | | | |
| cc. of Aqueous Distillate | 980 | 1090 | /4/ | 1070 | 1165 | 1250 | 820 | 965 | 740 | 1030 | 980 |
| grams of Liquid Resole Product | 2214 | 2194 | 2150 | 2141 | 2038 | 2032 | 2103 | 2010 | 1268 | 1871 | 2125 |
| Resole Product, Properties | | | | | | | | | | | |
| $H_2O$ content, weight % | 1.87 | — | — | 3.06 | 2.04 | 2.05 | — | — | 2.61 | 3.06 | — |
| —$CH_2OH$ content, weight % | 34.76 | — | — | 38.62 | 35.5 | 18.1 | — | — | 31.0 | 11.7 | — |
| Brookfield viscosity, cps. at 25° C. | 700 | 2500 | 45,000 | 1340 | 4400 | 16,400 | 3300 | 5100 | 46,400 | 32,800 | 4700 |
| Foam density, pcf. | 0.69 | 0.97 | 1.33 | 0.72 | 0.94 | 1.41 | 0.92 | 0.83 | 2.31 | 2.02 | 1.12 |

/1/ At the following reduced pressures (mm. Hg) for the respective temperatures: 285–325 (75° C.); 375–400 (80° C.); 470–480 (85° C.) 570 (90° C.)
/2/ To final reduced pressure of 77–90 mm. and 47–50° C.
/3/ To final reduced pressure of 40–41 mm. and 65–67° C.
/4/ Not recorded.

It is evident from the data of Table VIII as well as the data of Tables II, III and VI, that the process of the present invention allows for versatility in preparing phenol-formaldehyde resoles suitable for producing low and high density foams by appropriate adjustment of condensation conditions including formaldehyde factor, condensation time and temperature and catalyst concentration. Thus, as discussed with reference to the data of Table III, at a formaldehyde factor of 170, condensation temperature of 75° C. and a potassium hydroxide catalyst concentration of about two weight percent (basis phenol), highly reactive resoles for low density foam formation are provided at a relatively short condensation time (e.g., 2.25 hours) whereas resoles for higher density foam are provided at a longer condensation time (3.25 hours). As shown by the data of Table VI, highly reactive resoles for low density foam formation may also be prepared at longer condensation times (e.g., 3.25–4.25 hours) by lowering the formaldehyde factor to 120. Further, the data of Table VIII indicate that foams of desired density can be obtained by appropriate adjustment of the condensation temperature and/or catalyst concentration. In addition to their excellent reactivity as freshly prepared, ion-exchanged Resoles M through W of the present invention also have excellent aging characteristics, as illustrated by the results of Examples 34–40 hereinbelow.

EXAMPLES 34 and 35

Resoles Q and R prepared under the conditions of Examples 27 and 28 (Table VIII) were subjected to heat aging at 65° C. and atmospheric pressure under nitrogen for a total period of 18 hours in three stages of 5, 6 and 7 hours. After each heat aging stage, the respective resoles were analyzed for their water and methylol (—$CH_2OH$) contents, their viscosity measured and foaming behavior tested employing Foam Formulation B (Table VII). The results are given in the following Table IX which, for convenience, also includes the corresponding values for each resole as freshly prepared.

TABLE IX

| | | EFFECT OF HEAT AGING AT 65° C. AND ATMOSPHERIC PRESSURE ON RESOLE VISCOSITY AND FOAMING BEHAVIOR | | | | | | | |
|---|---|---|---|---|---|---|---|---|---|
| Example | Resole | Total Hours Heat Aged | Brookfield Viscosity cps. at 25° C. | Cream Time, seconds | Rise Time, seconds | Rise, inches | Foam Density, pcf | Percent —$CH_2OH$ | Percent $H_2O$ |
| 34 | Q /1/ | 0 | 4400 | 40 | 110 | 12 | 0.94 | 35.5 | 2.04 |
| 34-1 | Q-1 | 5 | 4300 | 35 | 90 | 12 | 0.86 | 33.8 | 2.77 |
| 34-2 | Q-2 | 11 | 5100 | 45 | 100 | 11 | 0.94 | 28.7 | 2.83 |
| 34-3 | Q-3 | 18 | 6100 | 45 | 130 | 11 | 0.92 | 34.2 | 3.05 |
| 35 | R /2/ | 0 | 16,400 | 40 | 90 | 9 | 1.41 | 18.1 | 2.05 |
| 35-1 | R-1 | 5 | 18,800 | 40 | 90 | 8 | 1.38 | 36.8 | 2.23 |
| 35-2 | R-2 | 11 | 24,000 | 55 | 110 | 7 | 1.53 | 23.6 | 2.24 |
| 35-3 | R-3 | 18 | 31,600 | 50 | 110 | 7 | 1.41 | 28.6 | 2.27 |

The results of Example 34 demonstrate the excellent retention of the high reactivity of Resole Q as a foamable resin after accelerating aging. This is reflected by the cream and rise times, height of rise and, in particular, by the foam densities which were substantially unchanged after each aging period. Resole R also exhibited excellent aging characteristics. The retention of reactivity and stability towards self-condensation exhibited by Resoles Q and R is also reflected by the observation that their water contents remained relatively low. Also noteworthy is the observation that, although resole viscosity increased during aging, the reactivity of the freshly prepared and aged resoles remained at about the same levels. This indicates that viscosity increase during aging of the ion exchanged resoles of the present invention is not caused by substantial self-condensation to higher molecular weight and less reactive polymers but rather to a physical phenomenon such as intermolecular bonding which, in the presence of added acidic curing catalysts, is readily cleaved to release highly reactive sites for rapid curing to phenolic foam.

Substantially the same trend of good retention of reactivity after heat aging is exhibited by other resoles of the invention such as above described Resoles A, C and D, notwithstanding a substantial increase in viscosity during the accelerated aging. This is graphically illustrated by accompanying Figure 1, which shows a correlation between viscosity, foam density and hours heat aged for ion exchanged Resoles A, C, D and R of the invention and for standard Resole I which is not of the invention. The numbers within parenthesis correspond to the total hours the resole had been aged at 65°

C. The respective curves of FIG. 1 correspond to the data of: comparative Runs C-1 through C-1c (Resole I), Examples 4 through 4-3 (Resole A) and Examples 6 through 6-3 (Resole C) of Table II and Examples 11 through 11-3 (Resole D) of Table III in each of which Foam Formulation A was used; and Examples 35 through 35-3 (Resole R) of Table IX in which Foam Formulation B was used. As shown by the curves for the resoles of the invention, reactivity of the resole, as reflected by foam density, remained relatively constant notwithstanding the substantial increase in viscosity. On the other hand, the reactivity of Resole I as the resole component of Foam Formulation A was substantially reduced after only 5 hours of heat aging (as reflected by an increase in foam density of more than one pound, from 2.84 to 4.11 pcf) and was essentially nil after heat aging for 11.5 hours even though the viscosity at this point, as well as after 18 hours, was at a level within which the resoles of the invention had good reactivity and were processable.

EXAMPLES 36–40

In accordance with these examples, the ambient aging characteristics were evaluated of Resoles M, P, S, T and W which were prepared as described under Examples 23, 26, 29, 30 and 33 of Table VIII. Each resole was simply stored at room temperature in a closed container and, after a prolonged storage period, samples were removed for viscosity measurements and testing of foaming behavior employing Foam Formulation B (Table VII). The number of days aged, the viscosity and foaming behavior after aging are given in Table X which also includes the corresponding initial data.

TABLE X

| ROOM TEMPERATURE STABILITY OF ION-EXCHANGED RESOLES | | | | | |
|---|---|---|---|---|---|
| Example | 36 | 37 | 38 | 39 | 40 |
| Resole | M | P | S | T | W |
| Resole Properties, Initial | | | | | |
| $H_2O$ content, weight % | 1.87 | 3.06 | — | — | — |
| —$CH_2OH$ content, weight % | 34.76 | 38.62 | — | — | — |
| Brookfield viscosity, cps. at 25° C. | 700 | 1340 | 3300 | 5100 | 4700 |
| Foam Reactivity | | | | | |
| Cream time, seconds | 20 | 30 | 20 | 25 | — |
| Rise time, seconds | 65 | 80 | 60 | 90 | — |
| Foam density, pcf. | 0.69 | 0.72 | 0.92 | 0.83 | 1.12 |
| Resole Properties After Ambient Aging | | | | | |
| Days aged | 130 | 99 | 132 | 34 | 126 |
| $H_2O$ content, weight % | 2.45 | 1.70 | — | — | — |
| —$CH_2OH$ content, weight % | 38.58 | 39.15 | — | — | — |
| Brookfield viscosity, cps. at 25° C. | 740 | 1600 | 3900 | 5400 | 6800 |
| Foam Reactivity | | | | | |
| Cream time, seconds | 20 | 30 | 45 | 40 | 75 |
| Rise time, seconds | 80 | 90 | 130 | 110 | 175 |
| Foam density, pcf. | 0.50 | 0.61 | 0.84 | 1.07 | 1.31 |

The data of Table X further demonstrate the excellent shelf life of the ion-exchanged resoles of the present invention. For the purpose of determining whether Resoles M, P, S, T and W had retained any reactivity as foamable resins after an extremely prolonged period of time, each was tested for foaming reactivity as the resole component of Foam Formulation B after ambient aging for an additional period of about 675 days beyond the days aged indicated in Table X. The viscosity, water content and the reactivity data for each resole after the indicated aging period are given in the following Table XI.

TABLE XI

| Resole | M | P | S | T | W |
|---|---|---|---|---|---|
| Total Days Aged at Ambient | 805 | 774 | 807 | 709 | 801 |

TABLE XI-continued

| | | | | | |
|---|---|---|---|---|---|
| Viscosity, cps. | 1560 | 4200 | 20,000 | 42,000 | 68,000 |
| $H_2O$, wt. % | 4.49 | 5.56 | 5.01 | 6.94 | 7.22 |
| Cream time, sec. | 75 | 100 | 105 | 185 | 180 |
| Rise time, sec. | 190 | 265 | 490 | 400 | 400 |
| Rise, inches | 13 | 13 | 5 | 6 | 4 |
| Density, pcf. | /1/ | /1/ | /1/ | 1.465 | /1/ |
| Shrinkage | 30% | 30% | 50% | ½" | 1" |

/1/ Not measured.

The above data quite surprisingly show that notwithstanding the fact that these resoles were ambient aged for periods of almost two years and longer, they retained sufficient reactivity and fluidity to be foamed. The foam product produced from aged Resole T was particularly good, having a shrinkage of only one-half inch and a foam density of 1.465.

EXAMPLE 41

Preparation of Resole X and Foaming Reactivity

In this example, a further liquid resole of the invention was prepared at a formaldehyde factor of 170 (1600 grams of phenol and 2740 grams of 37 weight percent aqueous formaldehyde) in the presence of 16 grams of potassium hydroxide catalyst (purity, 85.9%) dissolved in 188 grams of distilled water for a period of 3.25 hours at 85° C (480–525 mm. Hg. pressure). After the condensation reaction, the pH of the condensate (cooled to 45° C.) was 7.7. The condensate (4490 grams) was then slurried with cation exchange Resin A (350 grams) until the pH of the slurry stabilized at 2.5 which took about 16 minutes. The slurry was then filtered and the filtrate combined with anion exchange Resin A (1000 grams) for about 40 minutes. After this period, the pH of the slurry was 5.45. The anion exchange resin was separated by filtration and the filtrate was stripped of aqueous distillate (2216 grams) at about 48°–51° C. (100–85 mm. Hg) and a final condition of 65° C./15 mm. Hg. The remaining liquid product (2130 grams), designated herein as Resole X, had a Brookfield viscosity at 25° C. of 66,000 centipoise and a water content of 1.29 weight percent.

Following the above-described general foaming procedure, Resole X was employed as the resole component of Foam Formulation B of Table VII. The foam reactivity data are: cream time = 20 seconds; rise time = 100 seconds; tack-free time = 90 seconds; foam rise = 7.5 inches; and foam density = 1.64 pcf. The compressive strength and friability resistance of the foam product is included in Table XVII hereinbelow.

EXAMPLE 42

In accordance with this example, Resole X prepared in accordance with Example 41 above, was subjected to a standardized test to determine the gel time thereof, that is, the time required for the resole to reach a degree of polymerization whereby it becomes a gel. For comparison, the gel time was also determined of a phenol-formaldehyde resole, designated herein as comparative Resole I-A, which is a commercially employed resole designed for manufacture of medium density (1.5–2.5 pcf) rigid phenolic foam. In the manufacture of Resole I-A, the phenol-formaldehyde condensation is effected using barium hydroxide octahydrate as the catalyst and the condensate is neutralized with dilute sulfuric acid. As initially prepared, Resole I-A had a pH of 6.8, a water content of 7.0 weight percent and a viscosity of 2970 centipoise. Resole I-A is highly heat-reactive under ordinary storage conditions and thus it is normally recommended that it be stored below about 7° C. Prior to the determination of their respective gel times, Resole X of the invention had been stored at ambient temperature for about 43 days, and Resole I-A had been stored under refrigeration (about 5° C.). As used in this example, Resole I-A had a viscosity of 3400 centipoise. The gel times of ion exchanged Resole X and comparature Resole I-A were determined employing the same apparatus and procedure. In each determination, a one gram sample of resole was placed on the center of a hot plate set at 100° C., 130° C., 150° C. and 180° C., respectively. After a 30 second interval, the sample was stroked with a spatula and the time required to reach a state of polymerization characterized by initial stringing of the polymer (that is, the time to reach a tacky condition) was taken as the endpoint of the test. A number of measurements were made for respective samples of each resole at the indicated temperatures. Gel time measurements are made to determine relative cure speeds and thus the longer the gel time, the more stable is the resole towards polymerization to the fully cured, thermoset condition. The results are given in Table XII which follows.

TABLE XII

| | Gel Time Measurements | | | |
|---|---|---|---|---|
| | Gel Time | | | |
| | Resole X | | Resole I-A /1/ | |
| Temperature | Min. | Sec. | Min. | Sec. |
| 100° C. | 38 | 20 | 21 | 23 |
| | 43 | 55 | 17 | 50 |
| | 39 | 25 | 17 | 10 |
| Average | 40 | 33 | 18 | 47 |
| 130° C. | 14 | 0 | 4 | 25 |
| | 11 | 54 | 4 | 36 |
| | 14 | 30 | — | — |
| Average | 13 | 28 | 4 | 31 |
| 150° C. | 4 | 1 | 4 | 5 |
| | 5 | 36 | 2 | 50 |
| | 4 | 50 | 2 | 25 |
| | 4 | 20 | 2 | 13 |
| Average | 4 | 42 | 2 | 53 |
| 180° C. | 2 | 2 | 1 | 25 |
| | 2 | 5 | 1 | 21 |
| | 2 | 3 | — | — |
| Average | 2 | 3 | 1 | 23 |

/1/ Not a resole of the invention.

The results of Table XII demonstrate the enhanced inherent stability towards self-condensation of the ion exchanged resoles of the invention, as compared with commerical resoles supplied as foamable compositions. Notwithstanding their enhanced stability and thus their extended shelf life, the resoles of the invention also have greater reactivity as foamable compositions as compared with resoles used in commercial practice for the manufacture of medium density, rigid phenolic foam by pour-in-place foaming reactions. As shown by the foam reactivity data of Table II which are based on Foam Formulation A of Table I, Resole I which is not of the invention, provided a foam in comparative Run (C-1 (that is, prior to aging) having a density of about 2.84 pcf. On the other hand, Resoles A–C of the invention provided foams from the same formulation, having significantly lower densities both before and after accelerated aging, the lower densities being reflective of their enhanced reactivity as formable compositions. The greater reactivity of the ion exchanged resoles of the invention is further indicated by the observation that they require less catalyst to obtain foam of a given density than comparative Resoles I and I-A. For example, when Resole I is employed as the resole component of Foam Formulation B modified, however, to contain 24 parts of the acidic catalyst instead of only 9, the cream and rise times are 50 and 130 seconds, respectively, the foam rise is 7.5 inches, and the resulting foam has a density of 1.62 pcf which is about the same density (1.64 pcf) as that of the foam produced from Resole X of Example 41 at the lower concentration of 9 parts of the fluoboric acid catalyst. Similarly, when comparative Resole I-A is employed as the resole component of Foam Formulation B modified to contain 21 parts of acid catalyst and 40 parts of blowing agent, its foaming reactivity is: cream time = 80 seconds; rise time = 240 seconds; foam rise = 6.5 inches; and foam density = 1.59 pcf. It is evident, therefore, that, as compared with commercially employed resoles supplied for pour-in-place reactions, such as Resoles I and I-A, the ion exchanged products of the present invention possess an inherently greater reactivity as foamable compositions in that they provide foam of a particular density at lower levels of catalyst concentration.

EXAMPLE 43

Preparation of Resole Y

This example illustrates the preparation of the resoles of the invention on a pilot plant scale effecting deionization in fixed beds of exchange resins in columns. The condensation was effected in a stainless steel reactor provided with a condenser and agitator employing: 163 pounds of phenol and 279 pounds of aqueous formaldehyde solution (37 weight percent), the formaldehyde factor being about 170; and 11.5 pounds of an aqueous solution (about 12.5 weight percent) of potassium hydroxide (purity, about 85–86%). The pressure on the system was reduced to about 460 mm. Hg and the temperature raised to 75° C. in about 13 minutes. The exotherm caused refluxing and the temperature was controlled at 85° C. for 3 hours by adjustment of pressure (422–493 mm. Hg). The reaction product was cooled to about 30° C., discharged to a drum, and passed downwardly through a bed of 100 pounds of cation exchange Resin A contained in a plastic-lined tower (9.5 feet × 8 inches I.D.). The effluent from the cation exchange tower had a pH of 3.0 and was then passed downwardly through a bed of 160 pounds of anion exchange Resin A contained in a stainless steel tower (8 feet × 12 inches I.D.). The effluent from the anion exchange tower had a pH of 5.2, and was stripped of aqueous distillate (104.5 pounds) under reduced pressure (60-25 mm. Hg and 50°-60° C.). The resole product, designated herein as Resole Y, was obtained in a yield of 134 pounds per 100 pounds of phenol used and, upon analysis, was found to have a water content of 5.78 weight percent and a Brookfield viscosity (25° C.) of 22,800 centipoise. The reactivity of Resole Y as a foamable resin was determined both before and after aging for 54 days at ambient temperature. For this purpose, samples of the freshly prepared and aged material were employed as the resole component of Foam Formulation B (Table VII). The results are given in Table XIII.

TABLE XIII

| Resole Y | Unaged | Aged /1/ |
|---|---|---|
| $H_2O$, weight % | 5.78 | 4.26 |
| Viscosity, cps. | 22,800 | 40,000 |
| Cream time, seconds | 90 | 100 |
| Rise time, seconds | 260 | 300 |
| Foam density, pcf. | 2.15 | 2.03 |

/1/ Aged 54 days at ambient temperature.

The results of Table XIII further demonstrate the excellent shelf life of the resoles of the invention, as reflected by the fact that the respective medium densities of the foam products prepared from Resole Y as freshly prepared and after aging were substantially the same. Also noteworthy is the observation that, although the viscosity of the aged material had increased considerably, reactivity was not adversely affected.

EXAMPLE 44

Preparation of Resole Z

Following substantially the same manipulative procedure and using the equipment described under Example 43, a highly reactive resole suitable for spray application of phenolic foam was prepared, as described below.

The condensation reaction was effected employing: 171 pounds of phenol and 293 pounds of aqueous formaldehyde solution (37 weight percent), the formaldehyde factor being about 170; and about 1.1 pounds of potassium hydroxide (purity, about 85-86%) dissolved in 8.2 pounds of distilled water. The pressure on the system was reduced to about 400 mm. Hg and after the initial exotherm, the temperature was controlled at 75° C. for about 3 hours by adjustment of pressure (400-470 mm. Hg.). The reaction product was then cooled to about 34° C., discharged to a drum, and passed downwardly through a bed of 100 pounds of cation exchange Resin A contained in the tower described under Example 43. The effluent from the cation exchange tower had a pH of 2.2 and was then passed downwardly through a bed of anion exchange Resin A contained in the stainless steel tower. The effluent from the anion exchange tower had a pH of 4.7, and was stripped of aqueous distillate under reduced pressure (94-35 mm. Hg and 54°-63° C.). The resole product, designated herein as Resole Z, was obtained in a yield of 132 pounds per 100 pounds of phenol used. Upon analysis, Resole Z was found to contain 1.90 weight percent water and had a Brookfield viscosity (25° C.) of 860 centipoise. Resole Z is highly reactive and is thus suitable for use in forming phenolic foam of very low density (0.2 to about 0.5 pounds per cubic foot) by spray application employing spray apparatus such as that described in U.S. Pat. No. 3,122,326. Resole Z is also suitable for blending with less highly reactive resoles of the invention to satisfy a particular foam density specification.

EXAMPLE 45

An aging study was conducted on Resole Z by storing a portion thereof in a closed, one gallon capacity, glass container under static conditions at room temperature (average, 23°-26° C.). A sample of the aging resole was withdrawn periodically over a total aging period of about 16 months and was subjected to water analysis and viscosity measurement. About one month after aging of Resole Z was commenced, the same procedure was applied to a commercially employed phenol-formaldehyde resole, designated herein as comparative Resole IV, which is also designed for manufacture of very low density phenolic foam of 0.2 to 0.4 pcf. Resole IV is produced at a formaldehyde factor of about 120 (basis, 37 weight aqueous formaldehyde) employing barium hydroxide catalyst to effect the condensation reaction and, as in the case of comparative Resoles I and I-A, condensate is neutralized by the addition thereto of sulfuric acid, the resulting barium salt being left in the product. As initially manufactured, Resole IV had a pH of 6.3 and a viscosity of 743 centipoise. To maintain foam performance, it is normally recommended that Resole IV be stored below 21° C., although a maximum storage temperature of 24° C. can be tolerated if such storage does not exceed three months. Prior to the time Resole IV was subjected to this aging study, it had been kept under refrigeration. As of the time ambient aging of Resole IV was commenced, it had a water content of 2.23 weight percent and a Brookfield viscosity at 25° C. of 880 centipoise. The results are given in Table XIV.

TABLE XIV

| AMBIENT AGING OF SPRAY GRADE RESOLES | | | | | | | |
|---|---|---|---|---|---|---|---|
| RESOLE Z | | | | RESOLE IV /1/ | | | |
| Period of Aging | Total Days Aged | Water Wt. % | Viscosity cps | Period of Aging | Total Days Aged | Water Wt. % | Viscosity cps. |
| 0 | 0 | 1.9 | 860 | — | — | — | — |
| 1 | 31 | 1.16 /2/ | 1100 | 0 | 0 | 2.23 | 880 |
| 2 | 59 | 1.79 | 951 | 1 | 28 | 4.23 | 1150 |
| 3 | 90 | 1.89 | 1100 | 2 | 59 | 5.30 | 1420 |
| 4 | 120 | 1.90 | 1180 | 3 | 89 | 5.42 | 1420 |
| 5 | 151 | 1.91 | 1120 | 4 | 120 | 5.45 | 1750 |
| 6 | 162 | 1.90 | 1250 | 5 | 131 | 5.44 | 1920 |
| 7 | 197 | 1.90 | 1260 | 6 | 166 | 6.38 | 2400 |
| 8 | 229 | /3/ | 1270 | 7 | 198 | 7.85 /2/ | 2580 |
| 9 | 264 | 1.60 | 1300 | 8 | 233 | 6.20 | 2600 |
| 10 | 314 | 2.10 | 1280 | 9 | 283 | 6.84 | 3000 |
| 11 | 350 | 2.20 | 1300 | 10 | 319 | 7.19 | 3200 |
| 12 | 383 | 2.27 | 1240 | 11 | 352 | 7.15 | 4000 |
| 13 | 413 | 2.35 | 1240 | 12 | 382 | 7.42 | 4650 |
| 14 | 446 | 3.02 | 1300 | 13 | 415 | 7.23 | 8560 |
| 15 | 481 | 2.62 | 1280 | 14 | 450 | 7.84 | 20,400 |
| 16 | 509 | 2.82 | 1480 | 15 | 478 | 8.19 | 37,600 |

/1/ Not of the invention.
/2/ These values appear faulty in view of subsequent analysis.
/3/ Not measured.

The results of this aging study (that is, the data of Table XIV) are the basis of accompanying FIGS. 2 and 3 which show the change in water content (FIG. 2) and viscosity (FIG. 3) during aging. Inspection of these respective figures shows the substantially constant level of water and viscosity during aging of the deionized product (Resole Z) of the invention as compared with commercially employed Resole IV designed to provide the same grade of phenolic foam. The steep increase in viscosity for Resole IV during aging periods 14 and 15 thereof is too great to be shown on FIG. 3 because of the viscosity scale employed, these particular values being given in Table XIV. The relatively constant level of water for Resole Z throughout this extended ambient aging study of about sixteen months further indicates the outstanding inherent stability of the resoles of the invention towards self-condensation to higher molecular weight and less reactive resins.

EXAMPLE 46

Preparation of Resole XX and Foaming Reactivity

In this example, a further liquid resole of the invention was prepared in substantially the same manner and under the same conditions as Resole X of Example 41 above. Thus, the condensation reaction was effected at a formaldehyde factor of 170 (1600 grams of phenol and 2740 grams of 37 weight percent aqeuous formaldehyde) in the presence of 16 grams of potassium hydroxide catalyst (purity, 85.9%) dissolved in 188 grams of distilled water for a period of 3.25 hours at 85° C. (475-525 mm. Hg pressure). After the condensation reaction, the pH of the condensate (cooled to 45° C.) was 7.7. The condensate (4522 grams) was then slurried with cation exchange Resin A (350 grams) until the pH of the slurry stabilized at 2.5 which took about 14 minutes. The slurry was then filtered and the filtrate combined with anion exchange Resin A (1000 grams) for about 32 minutes. After this period, the pH of the slurry was 5.45. The anion exchange resin was separated by filtration and the filtrate was stripped of aqueous distillate (2299 grams) at about 48°-60° C. (100-60 mm. Hg) and a final condition of 65° C./15 mm. Hg. The remaining liquid product (1900 grams), designated herein as Resole XX, had a Brookfield viscosity at 25° C. of 85,000 centipoise and a water content of 1.25 weight percent.

Following the above-described general foaming procedure, Resole XX was employed as the resole component of Foam Formulation B of Table VII. The foam reactivity data are: cream time = 18 seconds; rise time = 90 seconds; tack-free time = 80 seconds; foam rise = 7.5 inches; and foam density = 1.62 pcf. The compressive strength and friability resistance of the foam product is included in Table XVII hereinbelow.

EXAMPLES 47-50

In accordance with these examples, a series of four further phenol-formaldehyde resoles of the invention, designated herein as Resoles AA, BB, CC and DD, were prepared at a formaldehyde factor of 170 (1600 grams of phenol and 2740 grams of 37 weight percent aqueous formaldehyde) in the presence of 16 grams of mercury cell grade potassium hydroxide catalyst dissolved in 188 grams of distilled water. The potassium hydroxide employed in each preparation was that commercially available in flake form from Hooker Chemical Corporation as Caustic Potash, Mercury Cell Grade which, in accordance with their Data Sheet No. 781-B (1971), has the following specifications (dry form):

TABLE XV

| | |
|---|---|
| KOH | 90.0% minimum |
| NaOH | 0.45% maximum |
| $K_2CO_3$ | 0.8% maximum |
| KCl | 100 p.p.m. maximum |
| $KClO_3$ | 1 p.p.m. maximum |
| $K_2SO_4$ | 20 p.p.m. maximum |
| Fe | 10 p.p.m. maximum |
| $SiO_2$ | 40 p.p.m. maximum |
| Ca | 5 p.p.m. maximum |
| Mg | 5 p.p.m. maximum |
| Hg | 0.02 p.p.m. maximum |

In the preparation of Resoles AA and BB, the condensation reactions were carried out for 3 hours and 15 minutes at 85° C. and a reduced pressure of 460-505 mm. Hg. In the preparation of Resoles CC and DD, the condensation reactions were effected for 3 hours and 20 minutes at 85° C. and a reduced pressure of 460-510 mm. Hg (Resole CC) and 460-500 mm. Hg (Resole DD). After the respective condensation reactions, the pH of the warm (about 35°-45° C.) respective condensates was measured. Each of the individual condensates was then slurried with cation exchange Resin A until the pH of the slurry was lowered to 2.7-2.75. After filtering, the cation-exchanged filtrates were slurried with anion exchange Resin A until the pH of the respective mixtures was raised to 5.5. The ion-exchanged products were then stripped of aqueous distillate at elevated temperature and reduced pressure. The stripping conditions were: 50°-54° C./115-100 mm. Hg (Resole AA); 51°-54° C./110-100 mm. Hg (Resole BB); 50°-55° C./105-60 mm. Hg (Resole CC); and 50°-55° C./105-70 mm. Hg (Resole DD). The final condition of each stripping operation was 65° C./40 mm. Hg. Table XVI hereinbelow sets forth the viscosity and water content of each liquid product, designated Resoles AA, BB, CC and DD, respectively, as well as the total amount of ion exchange resins employed, the pH of the condensates initially and after each ion exchange step, the amount of aqueous distillate collected and product yields. Table XVI, which follows, also includes corresponding data for above-described Resole X (Example 41) and Resole XX (Example 46).

TABLE XVI

| Example No. | 41 | 46 | 47 | 48 | 49 | 50 |
|---|---|---|---|---|---|---|
| Resole Designation | X | XX | AA | BB | CC | DD |
| Resole Preparation | | | | | | |
| pH after condensation | 7.7 | 7.7 | 7.7 | 7.8 | 7.7 | 7.75 |
| Cation exchange resin treatment | | | | | | |
| grams of resin used | 350 | 350 | 300 | 300 | 300 | 300 |
| pH after treatment | 2.5 | 2.5 | 2.75 | 2.75 | 2.7 | 2.75 |
| Anion exchange resin treatment | | | | | | |
| grams of resin used | 1000 | 1000 | 700 | 768 | 650 | 760 |
| pH after treatment | 5.45 | 5.45 | 5.5 | 5.5 | 5.5 | 5.5 |
| Total distillate collected, grams | 2216 | 2299 | 2081 | 2097 | 2175 | 2065 |
| Resole product yield, grams | 2130 | 1990 | 2117 | 2141 | 1950 | 2155 |
| Resole viscosity, centipoise /1/ | 66,000 | 85,000 | 86,000 | 104,000 | 108,000 | 82,000 |
| Resole water content, wt. percent | 1.29 | 1.25 | 1.71 | 1.80 | 1.59 | 1.68 |

/1/ Brookfied at 25° C. for Resoles X and XX; Brookfield at 26° C. for Resoles AA-DD.

EXAMPLES 51-54

In accordance with these examples, phenolic foams were prepared employing above-described Resoles AA, BB, CC and DD of Examples 47-50 as the resole component of Foam Formulation B which is defined in Table VII. In these preparations the above-described general foaming procedure was followed. Reactivity data of the resoles as foamable compositions are given in Table XVII as well as the compressive strength and friability resistance of the foam products. Compressive strength was measured in accordance with the procedure of ASTM D-1621. Friability resistance was measured using a combination of ASTM C-367 and C-421 tumbling tests, that is, the test specimens are conditioned at room temperature in red oak cubes in accordance with ASTM C-367, and the test time intervals (after two and eight minute periods for a total of 10 minutes) were in compliance with ASTM C-421. Table XVII also includes the reactivity of Resole X and Resole XX described under Examples 41 and 46, respectively, as well as the compressive strength and friability resistance of the foam products derived therefrom. Table XVII follows.

TABLE XVII

| Example No. | 41 | 46 | 51 | 52 | 53 | 54 |
|---|---|---|---|---|---|---|
| Foam Formulation B /1/ | | | | | | |
| Resole component | X /2/ | XX /3/ | AA /4/ | BB /4/ | CC /4/ | DD /4/ |
| Cream time, seconds | 20 | 18 | 30 | 30 | 25 | 25 |
| Rise time, seconds | 100 | 90 | 90 | 75 | 80 | 70 |
| Tack-free time, seconds | 90 | 80 | 60 | 55 | 50 | 55 |
| Rise height, inches | 7.5 | 7.5 | 7.5 | 7.5 | 7.5 | 8.5 |
| Shrinkage | trace | trace | trace | none | slight | slight |
| Foam Properties | | | | | | |
| Core density, pcf. | 1.64 | 1.62 | 1.51 | 1.59 | 1.63 | 1.42 |
| Compressive strength, psi (25° C.) | | | | | | |
| parallel | 15.3 | 16.3 | 18.3 | 20.5 | 20.5 | 15.5 |
| Perpendicular | 11.4 | 10.5 | 9.9 | 10.3 | 10.8 | 8.0 |
| Friability,% weight loss | | | | | | |
| After 2 minutes | 18 | 12 | 5 | 6 | 8 | 6 |
| After 10 minutes | 76 | 64 | 41 | 43 | 49 | 43 |

/1/ As defined in Table VII.
/2/ Prepared as described under Example 41.
/3/ Prepared as described under Example 46.
/4/ Prepared as described under Examples 47 through 50, respectively.

The results of Table XVII show that the phenolic foams produced with Resoles AA, BB, CC and DD exhibited a substantial improvement in friability resistance as compared with that of the foam products derived from Resoles X and XX, the essential difference between these two series of resoles being the nature of the potassium hydroxide catalyst employed to effect the phenol-formaldehyde condensation reaction. The specifications of the mercury cell grade potassium hydroxide (90%) employed in producing the condensates from which Resoles AA-DD were derived is given in Table XV under Examples 47-50 hereinabove. The potassium hydroxide employed in the preparation of each of Resoles X and XX was that supplied by J. T. Baker and Company as "Potassium Hydroxide Pellets, 'Baker Analyzed' Reagent". As reported on the container in which such pellets were supplied by J. T. Baker and Company, the actual analysis (lot number 45240) is as given in the following Table XVIII.

TABLE XVIII

| Component | Weight Percent |
|---|---|
| KOH | 85.9 |
| K₂CO₃ | 0.78 |
| Insolubles | 0.002 |
| Chloride | 0.003 |
| Nitrogen compound as N | 0.0003 |
| Phosphate | 0.0003 |
| Sulfate | 0.0005 |
| Ammonium hydroxide precipitate | 0.005 |
| Heavy metals as | |
| Silver | 0.0002 |
| Iron | 0.0003 |
| Nickel | 0.0005 |
| Sodium | 0.03 |

From the manufacturer's analysis given in Table XVIII, it is unclear how this particular potassium hydroxide was manufactured. However, in view of the relatively low KOH assay (85.9%), it would appear that it was not manufactured in a mercury cell. In any event, analyses of both types of potassium hydroxide by emission spectrometry and X-Ray fluorescence are given in the following Table XIX.

TABLE XIX

| | KOH Catalyst | |
|---|---|---|
| Emission Spectrometry, ppm. | Mercury Cell Grade /1/ | Baker Analyzed Reagent /2/ |
| Iron | 16 | 3 |
| Aluminum | 290 | 360 |
| Copper | 4 | Nil |
| Nickel | 7 | Nil |
| Chromium | 12 | Nil |
| X-Ray Fluorescence Intensities, wavelength (λ) | | |
| Iron | 1500 | Nil |
| Calcium | 3000 | 3000 |
| Silicon | 4500 | 4500 |
| Aluminum | 1200 | 1200 |
| Chlorine | 18000 | 25000 |
| Sulfur | 4000 | 4000 |
| Copper | 3000 | 3500 |

/1/ Hooker Chemical Corporation; supplied in flake form; employed as the condensation catalyst in the preparation of Resoles AA-DD.
/2/ J. T. Baker and Company; supplied in pellet form; employed as the condensation catalyst in the preparation of Resoles X and XX.

Notwithstanding the various analyses given in above Tables XV, XVIII and XIX, as previously expressed herein, the exact reason or reasons for the observed substantial improvement in friability resistance of the phenolic foams based on resoles of the invention (e.g., Resoles AA-DD) derived from condensates catalyzed in the presence of mercury cell grade potassium hydroxide, have not been elucidated.

EXAMPLE 55

Preparation of Resole EE

In accordance with this example, an additional phenol-formaldehyde resole of the invention, designated herein as Resole EE, was prepared at a formaldehyde factor of 170 (1600 grams of phenol and 2740 grams of 37 weight percent aqueous formaldehyde) in the presence of 16 grams of mercury cell grade potassium hydroxide catalyst dissolved in 188 grams of distilled water. The potassium hydroxide employed was the commercially available in flake form from Diamond Shamarock Chemical Company as "Flake Caustic Potash, Mercury Cell — Low Chloride." The following analysis of this material is as reported by the manufacturer:

TABLE XX

|  | Weight Percent |
| --- | --- |
| Equivalent KOH | 90, minimum |
| NaOH | 0.08 |
| $K_2CO_3$ | 0.8 |
| KCl as Cl | 0.01 |
| $KClO_3$ | None |
| $K_2SO_4$ | 0.002 |
| Fe | 0.0010 |
| Si | 0.0020 |
| Ca | 0.0005 |
| Mg | 0.0005 |

The condensation reaction was carried out for 3 hours and 15 minutes at 85° C. and a reduced pressure of 450–508 mm. Hg. The condensate was discharged from the reactor and weighed (4528 grams). The condensate was then passed through a tower (7.0 cm. I.D.) containing 1300 ml. of cation exchange Resin A. The pH of the effluent was 2.9 after a residence time in the bed of cation exchange resin of 14 minutes. The cation-exchanged resole was then passed through a tower (8.0 cm. I.D.) containing 1400 ml. of anion exchange Resin A for a total residence time of 10 minutes. The pH of the effluent was 5.3. The ion-echanged material was then stripped of aqueous distillate (2576 grams) at 54°–58° C./130–90 mm. mercury pressure and a final condition of 65° C/30 mm. Hg. The remaining liquid product (1844 grams), designated herein as Resole EE, had a Brookfield viscosity of 37,500 centipoise (25° C.) and a water content of 1.4 weight percent.

EXAMPLE 56

In accordance with this example, Resole EE of Example 55 was employed as the resole component of Foam Formulation A of Table I employing the above-described general foaming procedure. The reactivity data and physical properties of the foam product are given in the following Table XXI.

TABLE XXI

| Example No. | 56 |
| --- | --- |
| Foam Formulation A /1/ |  |
| Resole component | EE |
| Cream time, seconds | 35 |
| Rise time, seconds | 65 |
| Gel time, seconds | 45 |
| Rise height, inches | 7 |
| Foam shrinkage | slight |
| Core density, pcf. | 1.74 |
| Compressive strength, psi. at 25° C. |  |
| parallel | 20.0 |
| perpendicular | 16.9 |
| Friability: |  |
| Density, pcf. /2/ | 2.00 |
| Percent weight loss |  |
| After 2 minutes | 10 |
| After 10 minutes | 52 |
| After 20 minutes | 87 |

/1/ As defined in Table I.
/2/ Of foam specimens prepared for friability measurements.

The data of Table XXI are based on phenolic foam produced from Resole EE substantially as freshly prepared (viscosity, 37,500 centipoise; water content, 1.4 weight percent). After ambient aging for about 62 days, the Brookfield viscosity of Resole EE was 51,400 centipoise (25° C.) and its water content was 2.05 weight percent. Thereafter, that is, after the 62 days of aging at ambient temperatures, Resole EE was subjected to an accelerated aging study. For this purpose, the ambient aged resole (700 grams) was placed in a one-liter round bottom flask fitted with a theromometer, stirrer and an adapter open to the atmosphere. The resole was heated at 65° C. while slowly stirring for a period of 5 hours. At the end of this period, the heat aged resole, designated Resole EE-1, had a water content of 3.13 weight percent. Following the above-described general foaming procedure, a foam was prepared employing a 300 gram portion of Resole EE-1 as the resole component of Foam Formulation A (Table I). The reactivity data are: cream time = 60 seconds; rise time = 115 seconds; gel time = 80 seonds; and height of foam rise = 5.5 inches. Foam shrinkage was only 1/16 inch. Friability of the foam was also measured in accordance with the aforementioned standard procedures. The results of these measurements are: density of the foam specimens prepared for the friability determinations = 2.73 pounds per cubic foot; percent weight loss, after 2 minutes = 4, after 10 minutes = 20, and after a total of 20 minutes = 41. The remaining portion of Resole EE-1 was further heat aged at 65° C. for 13 additional hours following the procedure applied during the initial five hour period which included slow agitation while open to the atmosphere. After the total accelerated aging period of 18 hours, the resole, now designated Resole EE-2, had a Brookfield viscosity at 25° C. of 91,300 centipoise and a water content of 3.26 weight percent. Following the above-described general foaming procedure, foam was prepared employing Resole EE-2 as the resole component of Foam Formulation A (Table I). The reactivity data are: cream time = 100 seconds; rise time = 160 seconds; gel time = 120 seconds; and height of foam rise = 4.5 inches. Foam shrinkage was only 1/16 inch. Void formation was also observed which may have been caused by improper mixing of the formulation ingredients due to the relatively high viscosity of Resole EE-2. However, notwithstanding the substantial increase in viscosity and the rather severe aging to which Resole EE-2 had been subjected (that is, 62 days of ambient aging followed by a total period of 18 hours of accelerated heat aging at 65° C.), the water content thereof remainder at a relatively low level (3.26 weight percent) and substantial reactivity as a foamable resole was retained.

What is claimed is:

1. Foamable phenolic resoles which are free of ionic species removable by the free acid form of a cation exchange resin and the hydroxyl form of a strongly basic anion exchange resin and having a water content of no more than about 10 weight percent.

2. A cellular phenolic composition produced by polymerization, in the presence of an acidic polymerization accelerator and a blowing agent, of a phenolic resole as defined in claim 1.

3. Foamable phenol-formaldehyde resoles of extended shelf-life which are free of ionic species that respond to removal by the free acid form of a cation exchange resin and the hydroxyl form of a strongly basic anion exchange resin and having a water content of no more than about 6 weight percent.

4. Foamable phenol-formaldehyde resoles of extended shelf-life having a water content of no more than about 10 weight percent and being free of ionic species removable by the free acid form of a strongly acidic cation exchange resin and the hydroxyl form of a strongly basic anion exchange resin.

5. Foamable resoles as defined in claim 4 having a water content of no more than about 6 weight percent.

6. Compositions comprising foamable phenol-formaldehyde resoles of extended shelf-life which resoles have a water content of no more than about 10 weight percent, and have been condensed in the presence of an alkaline metal catalyst for the phenol-formaldehyde condensation reaction and subsequently deionized by ion exchange with the free acid form of a cation exchange resin and the hydroxyl form of a strongly basic anion exchange resin.

7. Compositions as defined in claim 6 in which the alkaline metal catalyst is a compound of an alkali metal.

8. Compositions as defined in claim 7 in which the catalyst is a potassium compound.

9. Compositions as defined in claim 7 in which the catalyst is a sodium compound.

10. Compositions as defined in claim 7 in which the catalyst is a cesium compound.

11. Compositions as defined in claim 6 in which the alkaline metal catalyst is a compound of an alkaline earth metal.

12. Compositions as defined in claim 11 in which the catalyst is a barium compound.

13. Foamable compositions comprising phenol-formaldehyde resoles having a water content of not more than about 10 weight percent which resoles have been condensed in the presence of potassium hydroxide catalyst and subsequently deionized by treatment with the free acid form of a strongly acidic cation exchange resin and the hydroxyl form of a strongly basic anion exchange resin.

14. A process for the formation of foamable phenolic resoles which comprises reacting a phenolic compound and an aldehyde at a molar ratio of aldehyde to phenolic compound from about 1:1 to about 3:1 in the presence of an alkaline metal catalyst at a condensation temperature between about 60° C. and about 110° C. such that aqueous alkaline condensate is formed, deionizing alkaline condensate by treatment thereof with the free acid form of a cation exchange resin and the hydroxyl form of a strongly basic anion exchange resin, and recovering phenolic resole having a water content of no more than about 10 weight percent as a product of the process.

15. A process for the formation of foamable liquid phenol-formaldehyde resoles of extended shelflife which comprises reacting phenol and formaldehyde at a formaldehyde:phenol molar ratio of from about 1:1 to about 3:1 in the presence of an alkaline metal catalyst at a condensation temperature between about 65° C. and about 100° C. such that aqueous alkaline condensate is formed, treating alkaline condensate with the free acid form of a cation exchange resin to reduce the pH thereof to a value between about 1.5 and about 4, treating the cation exchanged condensate with the hydroxyl form of a strongly basic anion exchange resin such that the pH is increased to a value within the range from about 4 to about 7, and recovering resole having a water content of no more than about 10 weight percent as a product of the process.

16. The process of claim 15 in which said alkaline metal catalyst is an inorganic oxygen-containing compound of potassium.

17. The process of claim 16 in which said potassium compound is potassium hydroxide.

18. The process of claim 17 in which said potassium hydroxide is of mercury cell grade.

19. The process of claim 15 in which said cation exchange resin is a strongly acidic resin.

20. The process of claim 15 in which the pH of the alkaline condensate is reduced to and substantially stabilized at a value between about 2 and about 3.5.

21. A process for the formation of foamable liquid phenol-formaldehyde resoles of extended shelflife which comprises condensing phenol at a formaldehyde:phenol molar ratio from about 1:1 to about 3:1 in the presence of potassium hydroxide catalyst at a condensation temperature between about 65° C. and about 100° C. such that alkaline liquid condensate is formed, intimately contacting alkaline condensate with the free acid form of a strongly acidic cation exchange resin under conditions such that the pH of condensate is decreased to and substantially stabilized at a value within the range between about 1.5 and about 4, passing cation exchanged liquid into intimate contact with the hydroxyl form of a strongly basic anion exchange resin under conditions such that the pH is increased and substantially stabilized at a value within the range between about 4 and about 7, and recovering liquid product comprising deionized phenol-formaldehyde resolves having a water content of no more than about 10 weight percent as a product of the process.

22. The process of claim 21 in which the liquid product is provided in substantially anhydrous form.

23. The process of claim 21 in which the liquid product is provided as an aqueous solution containing no more than about 6 weight percent water.

24. The process of claim 21 in which the pH of the liquid in contact with the cation exchange resin is substantially stabilized at a value within the range between about 2 and about 3.5.

25. The process of claim 21 in which the pH of the liquid in contact with the anion exchange resin is substantially stabilized at a value of at least about 4.5.

26. A process for the formation of foamable liquid phenol-formaldehyde resoles of extended shelflife which comprises condensing phenol and formaldehyde at a formaldehyde:phenol molar ratio from about 1:1 to abot 3:1 in the presence of potassium hydroxide at a condensation temperature between about 65° C. and about 100° C., intimately contacting alkaline condensate with the free acid form of a strongly acidic cation exchange resin under conditions such that the pH of condensate is decreased to and substantially stabilized at a value within the range from about 2 to about 3.5, passing cation-exchanged liquid into intimate contact resin under conditions such that the pH is increased and substantially stabilized at a value within the range from about 4.5 to about 6.5, and reducing the water content of the ion exchanged liquid to a level no more than about 10 weight percent and recovering liquid phenol-formaldehyde resole having a water content no more than about 10 weight percent as a product of the process.

27. A liquid phenol-formaldehyde resole produced by the process of claim 26.

28. A process as defined in claim 26 in which said potassium hydroxide is of mercury cell grade.

29. A liquid phenol-formaldehyde resole produced by the process of claim 28.

30. A process as defined in claim 26 in which the water content of the ion exchanged liquid is reduced to a level no more than about 4 weight percent, and the recovered resole has a water content no more than about 4 weight percent.

31. A phenolic foam produced by polymerization of a deionized phenol-formaldehyde resole having a water content no more than about 10 weight percent, in the presence of a strongly acidic polymerization accelerator, a blowing agent comprising a halogenated organic compound having a boiling point between about minus 40° F. and about 200° F., and a surface active agent, wherein said deionized phenolformaldehyde resole is free of ionic species that respond to removal by the free acid form of a cation exchange resin and the hydroxyl form of a strongly basic anion exchange resin.

32. A phenolic foam produced by polymerization of a phenol-formaldehyde resole in the presence of a strongly acidic accelerator, a blowing agent and a surface active agent, wherein said phenol-formaldehyde resole is free of ionic species that respond to removal by the free acid form of a cation exchange resin and the hydroxyl form of a strongly basic anion exchange resin and has a water content no more than about 10 weight percent.

33. A phenolic foam produced by polymerization of a phenol-formaldehyde resole in the presence of a strongly acidic accelerator, a blowing agent comprising a halocarbon and a surface active agent, wherein said phenolformaldehyde resole is provided by treatment of a potassium hydroxide-catalyzed condensate with the free acid form of a strongly acidic cation exchange resin and the hydroxyl form of a strongly basic anion exchange resin and wherein said resole has a water content of no more about 6 weight percent.

34. A phenolic foam as defined in claim 33 wherein the said resole has a water content no more than about 4 weight percent.

* * * * *

UNITED STATES PATENT OFFICE
CERTIFICATE OF CORRECTION

Patent No. 4,033,909            Dated July 5, 1977

Inventor(s) Anthony Joseph Papa

It is certified that error appears in the above-identified patent and that said Letters Patent are hereby corrected as shown below:

Column 3, line 54, for "catalysts" read -- catalysis --. Column 6, line 8, before "7" read -- about --; line 35, before "exchange" read -- anion --. Column 8, lines 37-41, that portion of formula (12) reading

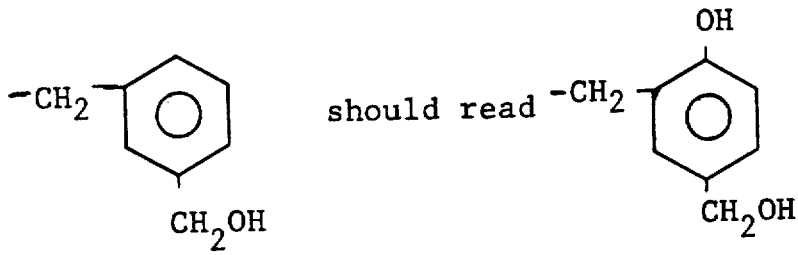

Column 15, line 26, for "-like" read -- -life --. Column 16, line 26, for "-1,2,2-triflurorethane" read -- -1,2,2-trifluoroethane --; line 50, for "knonw" read -- known --. Column 17, line 40, for "OH" read -- OH⁻ --. Column 18, line 23, for "as" read -- method --. Column 19, line 13, before "period" read -- a --. Column 20, line 16, for "finaldehydra-" read -- final dehydra- --; line 53, for "resoleremaining" read -- resole remaining --. Column 22, line 64, for "form" read -- foam --; line 67, for "I" read -- In --. Column 24, line 47, for "untthe" read -- until the --. Column 26, line 33, for "resules" read -- resoles --. Column 27, line 35, for "ofthe" read -- of the --. Column 29, line 37, after "aging" and before the period (.), read -- , their viscosity increased markedly after heat aging --. Column 37, line 55, after "tower", the partially illegible type should read -- . The --; line 56, after "had", the partially illegible type reads -- a pH --. Columns 39-40, Table XVI, in the first line of footnote /1/, for "Brookfied" read

UNITED STATES PATENT OFFICE
CERTIFICATE OF CORRECTION

Patent No. 4,033,909          Dated    July 5, 1977

Inventor(s)    Anthony Joseph Papa

It is certified that error appears in the above-identified patent and that said Letters Patent are hereby corrected as shown below:

-- Brookfield --. Column 43, line 13, for "Shamarock" read
-- Shamrock --; line 40, for "ion-echanged" read
-- ion-exchanged --. Column 44, line 18, for "theromome-"
read -- thermome- --; line 28, for "seonds" read --seconds --.
Column 45, line 64, for "shelflife" read -- shelf-life --.
Column 46, line 24, for "shelflife" read -- shelf-life --;
line 41, for "resolves" read -- resoles --; line 56, for
"shelflife" read -- shelf-life --; line 59, for "abot" read
-- about --; line 66, after "contact" read -- with the
hydroxyl form of a strongly basic anion exchange --. Column 47,
line 25, for "phenolformaldehyde" read -- phenol-formaldehyde --.
Column 48, line 17, for "phenolformaldehyde" read
-- phenol-formaldehyde --.

Signed and Sealed this

Twenty-fifth Day of October 1977

[SEAL]

Attest:

RUTH C. MASON
*Attesting Officer*

LUTRELLE F. PARKER
*Acting Commissioner of Patents and Trademarks*